United States Patent [19]

Bahl et al.

[11] Patent Number: 4,748,670
[45] Date of Patent: May 31, 1988

[54] APPARATUS AND METHOD FOR DETERMINING A LIKELY WORD SEQUENCE FROM LABELS GENERATED BY AN ACOUSTIC PROCESSOR

[75] Inventors: Lalit R. Bahl, Amawalk; Frederick Jelinek, Briarcliff, both of N.Y.

[73] Assignee: International Business Machines Corporation, Armonk, N.Y.

[21] Appl. No.: 738,911

[22] Filed: May 29, 1985

[51] Int. Cl.$^4$ .............................................. G10L 5/00
[52] U.S. Cl. ................................................... 381/43
[58] Field of Search ................................. 381/41–43; 364/513.5

[56] References Cited

U.S. PATENT DOCUMENTS

| | | | |
|---|---|---|---|
| Re. 31,188 | 3/1983 | Pirz et al. | 179/1 SD |
| 3,188,609 | 6/1965 | Harmon et al. | 340/146.1 |
| 3,202,761 | 8/1965 | Bibbero | 179/1 |
| 3,344,233 | 9/1967 | Wellesley | 179/1 |
| 3,883,850 | 5/1975 | Martin et al. | 340/172.5 |
| 3,969,700 | 7/1976 | Bollinger et al. | 340/146.3 |
| 4,059,725 | 11/1977 | Sakoe | 179/1.5 D |
| 4,256,924 | 3/1981 | Sakoe | 179/1 SD |
| 4,277,644 | 7/1981 | Levinson et al. | 179/1 SD |
| 4,286,115 | 8/1981 | Sakoe | 179/1 SD |
| 4,319,221 | 3/1982 | Sakoe | 340/146.3 |
| 4,336,421 | 6/1982 | Welch et al. | 179/1 SD |
| 4,400,788 | 8/1983 | Myers et al. | 364/513 |

OTHER PUBLICATIONS

L. R. Bahl et al., "Faster Acoustic Match Computation", IBM Technical Disclosure Bulletin, vol. 23, No. 4, Sep. 1980, pp. 1718–1719.
F. Jelinek, "Continuous Speech Recognition by Statistical Methods", Proceedings of the IEEE, vol. 64, No. 4, pp. 532–556, Apr. 1976.
L. R. Bahl et al., "A Maximum Likelihood Approach to Continuous Speech Recognition", IEEE Transactions on Pattern Analysis and Machine Intelligence, vol. PAMI-5, No. 2, pp. 179–190, Mar. 1983.
F. Jelinek et al., "Design of a Linguistic Statistical Decoder for the Recognition of Continuous Speech", IEEE Transactions on Information Theory, vol. IT-21, No. 3, pp. 250–256, New York, U.S., May 1975.

*Primary Examiner*—Emanuel S. Kemeny
*Attorney, Agent, or Firm*—M. A. Block

[57] ABSTRACT

Continuous speech recognition is improved by use of a known vocabulary and context probabilities. First, the unknown utterance is analyzed as a sequence of phonemes, then each phoneme labelled to form a string of labels. The shortest label interval which is recognized as a word is assigned a storage stack where similar-sounding candidate words are stored. Multiple stack decoding, and liklihood envelope criteria for word path extension decisions, are further features of the system.

17 Claims, 20 Drawing Sheets

STAGES FOR STACKING "TO BE OR NOT TO BE"

FREQUENCY IN CYCLES PER SECOND

PHONS

DETAILED MATCH LATTICE

FIG. 16
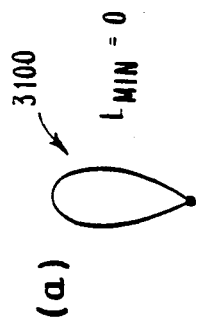
(a)
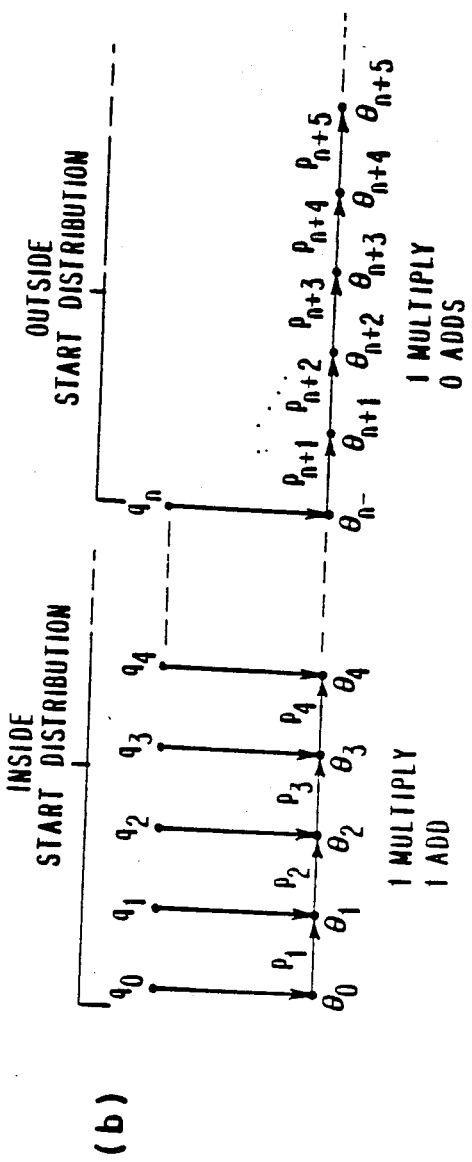
(b)

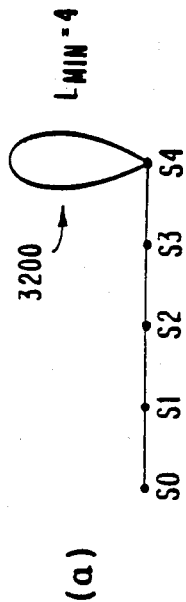
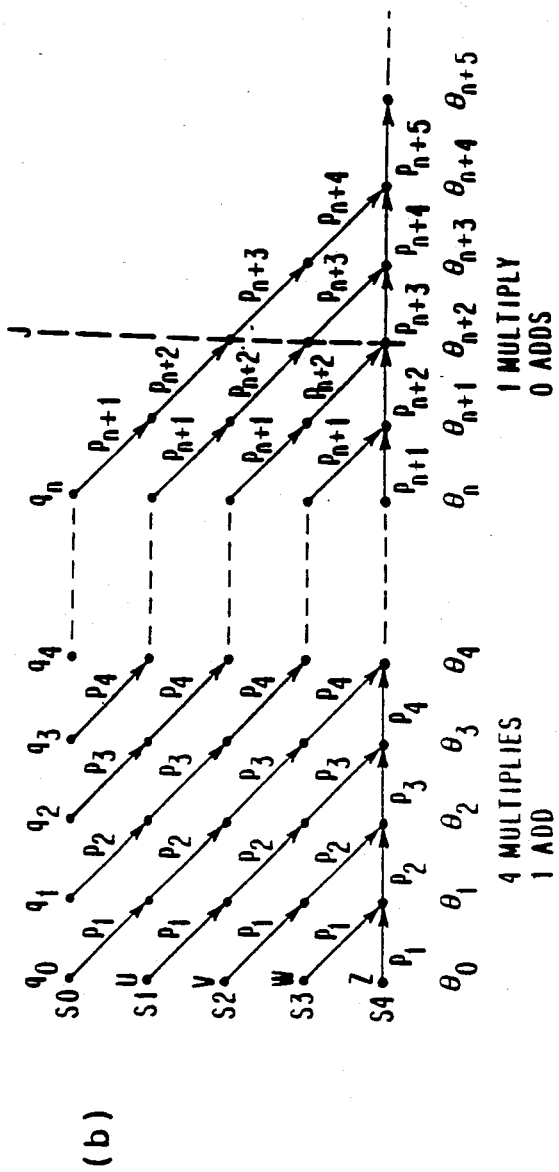
FIG. 17

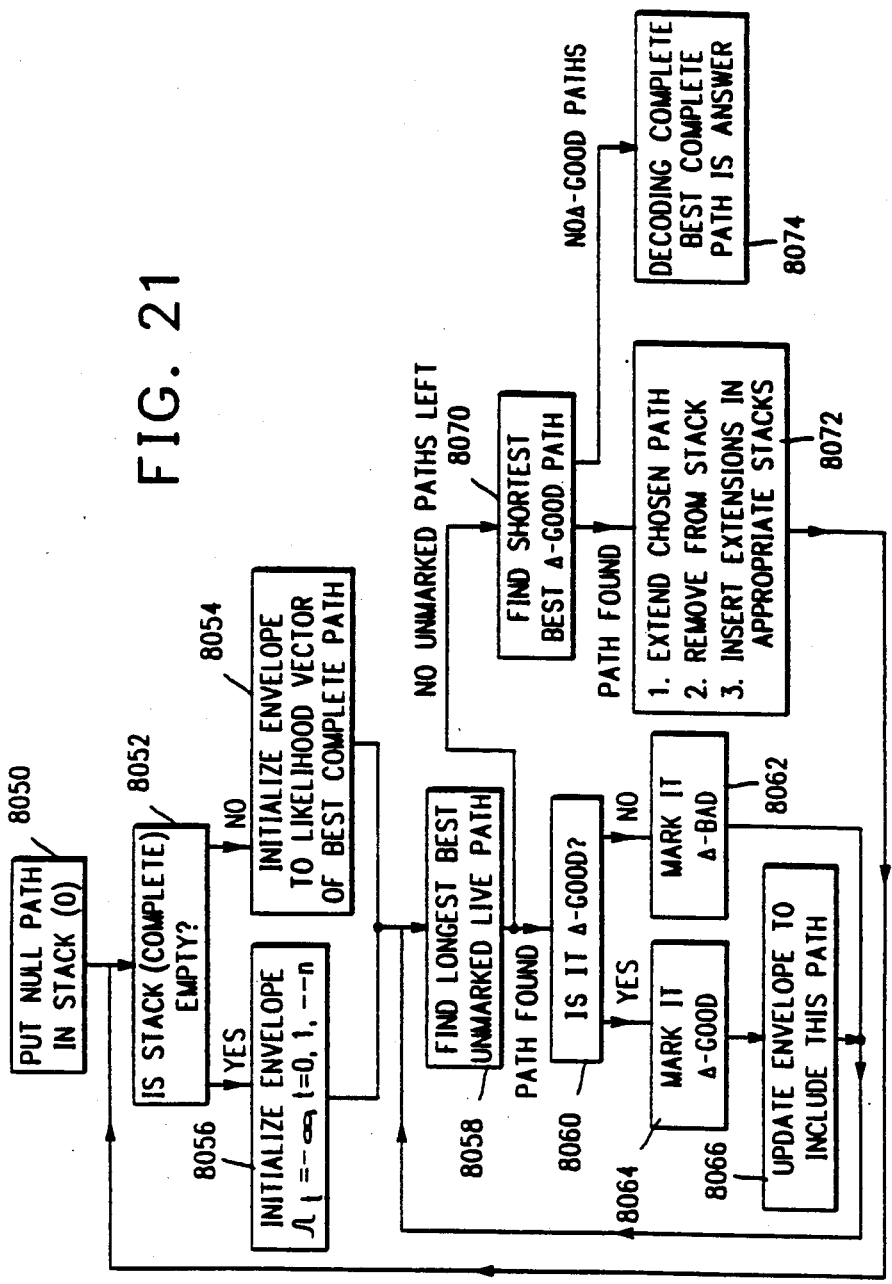

APPARATUS AND METHOD FOR DETERMINING A LIKELY WORD SEQUENCE FROM LABELS GENERATED BY AN ACOUSTIC PROCESSOR

FIELD OF THE INVENTION

The present invention relates generally to the field of speech recognition and specifically to the field of determining a likely sequence of words in response to a speech input.

DESCRIPTION OF PRIOR AND CONTEMPORANEOUS ART

The following cases relate to inventions which provide background or environment for the present invention: "Nonlinear Signal Processing in a Speech Recognition System", Ser. No. 06/665,401 filed Oct. 26, 1984; and "Apparatus and Method for Performing Acoustic Matching", Ser. No. 06/672,974 filed Nov. 19, 1984, now abandoned.

Typically, the purpose of a speech recognition system or machine is to automatically transform natural speech into some other form, for example written form. In achieving this aim, various general approaches have been considered. One approach is directed to simulating human speech interpretation processes. Another approach is to view speech in a statistical context.

In the statistical approach itself, several techniques have been considered as suggested by the Bahl, Jelinek, and Mercer article, "A Maximum Likelihood Approach to Continuous Speech Recognition," *IEEE Transactions on Pattern Analysis and Machine Intelligence*, Volume PAMI-5, Number 2, pp. 179-190 (1983). In the Bahl-Jelinek-Mercer article, it is noted that a typical model of a speech recognition system includes a text generator followed by a speaker, or talker. The text generator determines what is to be said and the speaker produces a natural speech waveform. The natural speech waveform enters an acoustic processor, the output from which enters a linguistic decoder. Depending on the technique employed, the above-noted elements may be associated in various ways. In the above-cited article the speaker and acoustic processor are combined to function as an acoustic channel wherein the speaker provides text as a speech waveform and wherein the acoustic processor acts as a data compressor which provides a string of labels (also referred to as symbols or fenemes) to the linguistic decoder. The labels may be generated in any of a number of ways and are commonly identified collectively as a string Y made up of sequential labels $y_1 y_2 y_3 \cdots$.

In the above-noted article, which is incorporated herein by reference, one acoustic processor—the IBM centisecond acoustic processor (CSAP)—is described as transforming the speech waveform into a string of parameter vectors. Each parameter vector is compared to stored prototypes (or standard vectors)—the distance from the parameter vector and each prototype being determined. The "label" for the prototype which is closest is then assigned to the waveform parameter vector. The label can have any of various forms and may be determined in any of various known manners in accordance with existing technology.

A purpose of the linguistic decoder is to perform a matching process between the incoming labels and words provided in the system vocabulary. In the probabilistic approach set forth in the Bahl-Jelinek-Mercer article, the linguistic decoder aims at determining a word string W that has the highest probability given the string of labels $y_1 y_2 y_3 \cdots$. That is, the desired end result is to determine the most likely sequence (or sequences) of words which corresponds to the string of labels generated by the acoustic processor. Mathematically, this is represented by the expression:

$$\text{MaxPr}(W|Y), \quad (1)$$

the maximum probability of W given Y over all word strings W. As is well known, the probability $\Pr(W|Y)$ can be written as:

$$\Pr(W|Y) = \Pr(W) \times \Pr(Y|W)/\Pr(Y) \quad (2)$$

where $\Pr(Y)$ is independent of W.

A key question in linguistic decoding has been how to determine which sequence of words (each word being from a vocabulary of words) has the highest likelihood given the labels generated by the acoustic processor.

One approach to determining the most likely path (or sequence) of successive words W* is to look at each possible path and determine the probability of each such path given the string of labels that is being decoded. The path having the highest probability associated therewith is then selected. With a 5000 word vocabulary, this approach becomes unwieldy, especially when the sequence of words is lengthy.

Two other commonly known approaches for finding the most likely word sequence W* are Viterbi decoding and stack decoding. Each of these techniques are described in the above-cited article entitled "A Maximum Likelihood Approach to Continuous Speech Recognition" at sections V and VI respectively.

A stack decoding technique in the article relates to single stack decoding. That is, paths of varying length are listed in a single stack according to likelihood and decoding is based on the single stack. Single stack decoding must account for the fact that likelihood is somewhat dependent on path length and, hence, normalization is generally employed. Normalization, however, can result in excessive searching and search errors due to inadequate searching if the normalization factor is not properly estimated.

The Viterbi technique, while not requiring normalization, is generally practical for only small tasks. In large vocabulary applications, the Viterbi algorithm which is basically time synchronous may have to be interfaced with an acoustic matching component which is asynchronous. In this event, the resulting interface is not neat.

SUMMARY OF THE INVENTION

It is therefore an object of the present invention to determine the word sequence W* which has the largest a posteriori probability $\Pr(W|Y)$ for a given string of labels Y and which improves over techniques previously considered in the technology.

Specifically, the present invention provides a method of decoding the most probable sequence of words for a string of labels without the need for normalization.

Moreover, the present invention provides a method which need not include interfacing a time synchronous component with an asynchronous component.

Further, the present invention relates to methodology whereby the most probable word sequence W* can be decoded with low computational requirements and high accuracy relative to other techniques.

The apparatus and methodology which achieves the above objects and others features multi-stack decoding and a unique decision strategy to determine which sequence of words should be at a given time. In accordance with the decision strategy, a path of relatively short length is not penalized because of its shortness but is, instead, judged on its likelihood.

With reference to the multiple stacks, the invention provides for a stack element at each label interval. For a subject word path, there is a boundary label interval at which the subject word path has the highest likelihood of ending. Also, for each ith label interval extending up to the boundary label therefor there is a likelihood of the subject word path generating the labels up to the ith label interval. The determination of these likelihoods is discussed in the Bahl-Jelinek-Mercer article cited above. At each ith label interval, there is a respective stack into which is entered all the word paths having a boundary label thereat. The word paths in a given stack are ordered according to their respective likelihoods at the ith label interval.

The decision strategy of the invention includes forming a likelihood envelope which assigns to each label interval the highest likelihood thereat for any of a selected number of word paths. The likelihoods along the envelope are then reduced by some predefined amount. The following steps are then performed: (a) examining the word path entries in all label stacks longest first and, where a label stack has more than one entry, examining the word paths based on decreasing likelihood wherein said examining includes the step of (i) classifying a word path as good if the likelihood at the label corresponding to the boundary label for a subject word path exceeds the reduced likelihood at the label corresponding to the boundary label and (ii) repeating step (a)(i) for each word path as the subject word path; (b) after classifying a word path as good, up-dating the likelihood value for each label in the envelope as either (i) the current likelihood value in the envelope or (ii) the likelihood value in the classified good word path, whichever is greater; and (c) after all word paths have been classified, selecting the shortest good word path as the word path to be extended or, if there is more than one good word path having the shortest length, selecting one or more shortest word paths having the highest likelihood value at the boundary label thereof. For each selected path, a list of likely follower words which (relative to other words in the vocabulary) have a high likelihood of following the selected good word path is formed. The list is formed preferably in accordance with the teachings of the co-pending application entitled "Apparatus and Method for Performing Acoustic Matching".

Each word in the list is separately appended to the selected good word path to form a plurality of extended word paths. The selected good word path is removed from its stack and each extended word path is entered into a respective stack. With the stacks re-formed, the procedure is repeated to determine which word path or paths should next be extended. By extending the selected shortest good paths each time, the short word paths are permitted to catch up with the longer word lengths. In accordance with the invention, longer words do not appreciate an advantage over short words simply because of length. The invention provides an opportunity for a word path of initially short length to be extended without being prematurely rejected.

Apparatus, in accordance with the invention, for determining a likely word path from a plurality of word paths given a string of labels generated at successive intervals wherein word paths corresponding to sentences are recognized, comprises: (a) means for assigning to each label interval a label stack; (b) means for determining for a subject word path (i) a boundary label interval at which the subject word path most likely ends and (ii) a likelihood at each label interval prior to an including the boundary label interval thereof; (c) means for assigning the subject word path to the label stack corresponding to the boundary label thereof as an entry therein; (d) said determining means and assigning means acting on each word path; (e) means for maintaining a complete-path stack which contains the most likely word path, if any, corresponding to a sentence; (f) means for forming a likelihood envelope as (i) the respective likelihoods for the word path contained in the complete-path stack or (ii), if there is no word path contained in the complete-path stack, a minimum reference likelihood at each label interval; (g) means for reducing the likelihoods in the likelihood envelope; (h) means for examining the word path entries in all label stacks longest first and, where a label stack has more than one entry, examining the word paths based on decreasing likelihood wherein said examining means includes (i) means for classifying a word path as good if the likelihood at the label corresponding to the boundary label for a subject word path exceeds the reduced likelihood at the label corresponding to the boundary label (ii) said classifying means acting on each word path as the subject word path; (j) means for up-dating, after classifying a word path as good, the likelihood value for each label in the envelope as either (i) the current likelihood value in the envelope or (ii) the likelihood value in the classified good word path, whichever is greater; and (k) means for selecting, after all word paths have been classified, the shortest good word path as the word path to be extended or, if there is more than one good word path having the shortest length, selecting the shortest word path having the highest likelihood value at the boundary label thereof.

BRIEF DESCRIPTION OF THE DRAWINGS

FIG. 16(a) is a diagram showing a particular phone machine of minimum length zero and FIG. 16(b) is a time diagram corresponding thereto.

FIG. 17(a) is a phone machine corresponding to a minimum length four and FIG. 17(b) is a time diagram corresponding thereto.

FIG. 21 is a flowchart representing steps in stack decoding according to the invention.

DESCRIPTION OF A PREFERRED EMBODIMENT OF THE INVENTION (I) Speech Recognition System Environment A. General Description In FIG. 1, a general block diagram of a speech recognition system 1000 is illustrated. The system 1000 includes a stack decoder 1002 to which are connected an acoustic processor (AP) 1004, an array processor 1006 used in performing a fast approximate acoustic match, an array processor 1008 used in performing a detailed acoustic match, a language model 1010, and a work station 1012.

The acoustic processor 1004 is designed to transform a speech waveform input into a string of labels, or fenemes, each of which in general sense identifies a corresponding sound type. In the present system, the acoustic processor 1004 is based on a unique model of the human ear. and is described in the above-mentioned application entitled "Nonlinear Signal Processing in a Speech Recognition System".

Figure 2:
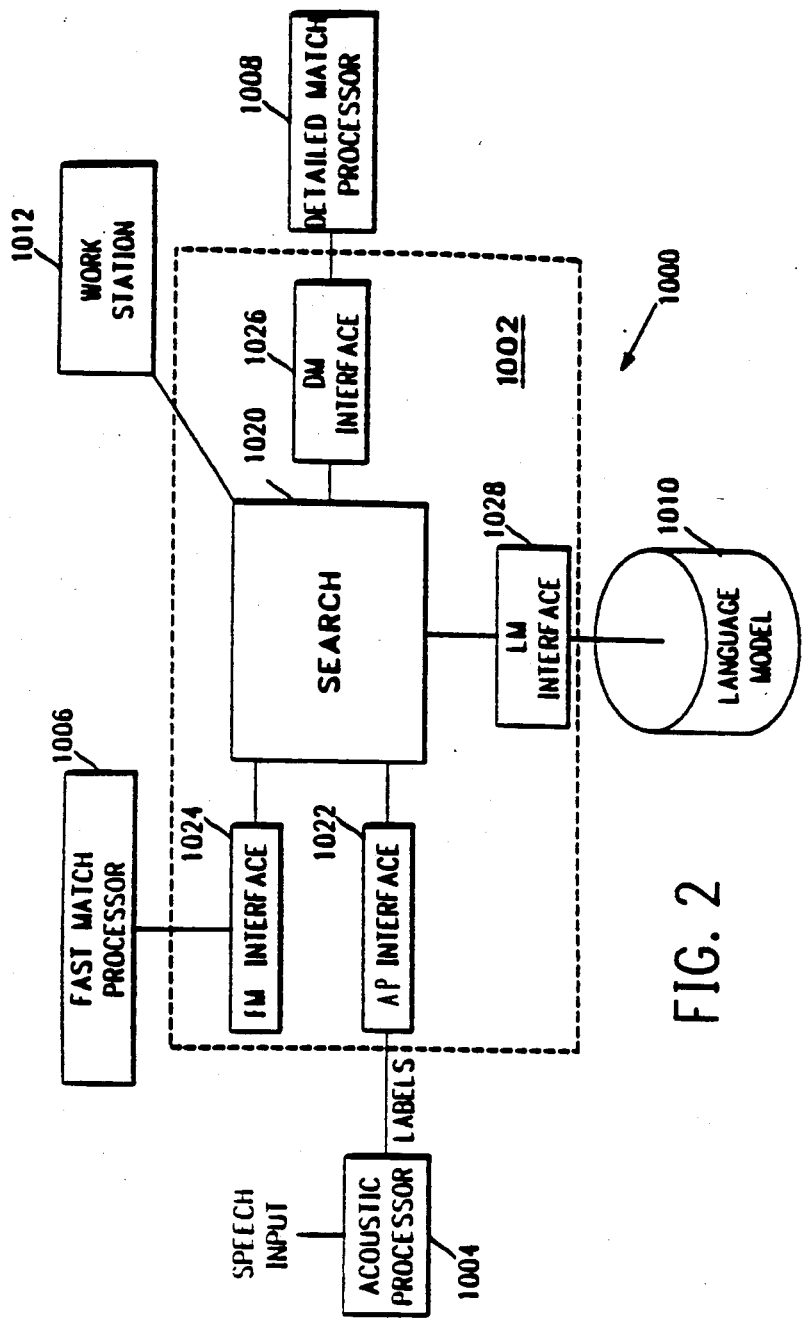
FIG. 2 is a block diagram of the system environment of FIG. 1 wherein the stack decoder is shown in greater detail.

The labels, or fenemes, from the acoustic processor 1004 enter the stack decoder 1002. In a logical sense, the stack decoder 1002 may be represented by the elements shown in FIG. 2. That is, the stack decoder 1002 includes a search element 1020 which communicates with the work station 1012 and which communicates with the acoustic processor process, the fast match processor process, the detailed match process, and the language model process through respective interfaces 1022, 1024, 1026, and 1028. The work station 1012 permits a user to edit and enter commands which permit the user to format the output with punctuation, paragraphs, capitalization, and the like. The work station 1012 is the subject of a copending patent application entitled "Text Editor for Speech Input", Ser. No. 06/666,212, filed Oct. 30, 1984.

In operation, fenemes from the acoustic processor 1004 are directed by the search element 1020 to the fast match processor 1006. The fast match procedure is described hereinbelow as well as in the application entitled "Apparatus and Method for Performing Acoustic Matching". Briefly, the object of matching is to determine the most likely word (or words) for a given string of labels based on acoustic probabilities.

The fast match is designed to examine words in a vocabulary of words and to reduce the number of candidate words for a given string of incoming labels. The fast match is based on probabilistic finite state machines, also referred to herein as Markov models.

Once the fast match reduces the number of candidate words, the stack decoder 1002 communicates with the language model 1010 which determines the contextual likelihood of each candidate word in the fast match candidate list based preferably on existing tri-grams. Preferably, the detailed match examines those words from the fast match candidate list which have a reasonable likelihood of being the spoken word based on the language model computations. The detailed match is discussed in the above-mentioned application entitled "Apparatus and Method for Performing Acoustic Matching".

Figure 3:
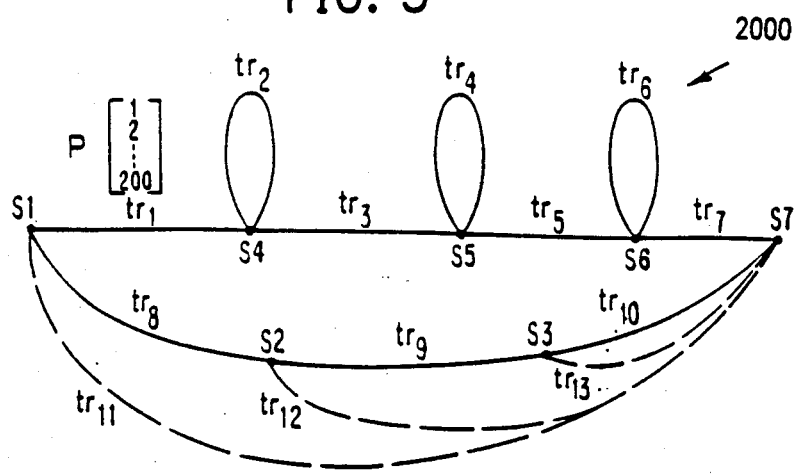
FIG. 3 is an illustration of a detailed match phone machine which is identified in storage and represented therein by statistics obtained during a training session.

The detailed match is performed by means of Markov model phone machines such as the machine illustrated in FIG. 3.

After the detailed match, the language model is, preferably, again invoked to determine word likelihood. The stack decoder 1002 of the present invention—using information derived from the fast matching, detailed matching, and applying the language model—is designed to determine the most likely path, or sequence, of words for a string of generated labels.

The present invention relates to determining which word path or word paths are most likely and then extending each such path by each word found to be a likely successor word according to the fast match, detailed match, and language model procedures.

Figure 4:
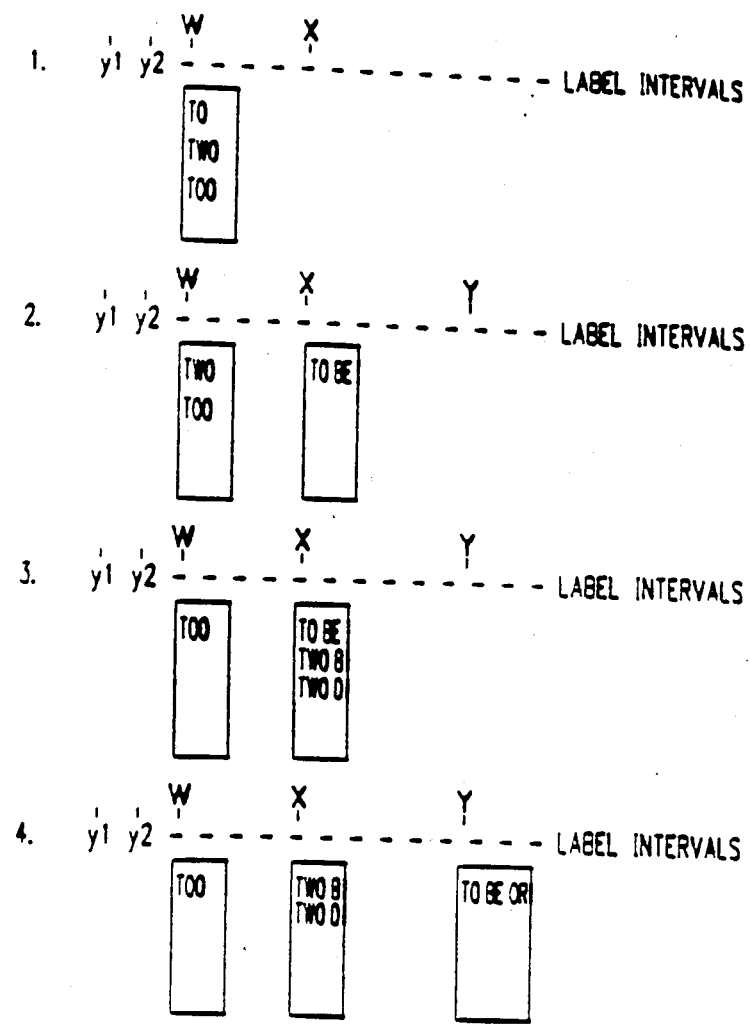
FIG. 4 is an illustration showing successive steps of stack decoding.

By way of example, reference is made to FIG. 4. In FIG. 4, a multiple stacking arrangement according to the present invention is shown at three successive processing times. At the first processing time, three words "to", "two", and "too" are found likely as the result of fast match, detailed match, and language model processing. Each of the three words has a most likely ending at label W. That is, it is determined that the first word represented by the incoming labels is likely to be either "to", "two", or "too" listed in decreasing order of likelihood and that each of these words most likely ends at label interval (or label position) W. As subsequent labels are examined at processing time 2, it is found that "to be" is a likely path. That is, given the label string and given "to" as the preceding word, the fast match, detailed match, and language model together determine that "be" is a likely follower (or successor) word. Similarly, at processing time 3, it is found that the word "two" may be followed by "b" or "d". The paths "to be", "two b", and "two d" each ends most likely at label interval X and are entered into a stack corresponding to label interval X. At processing time 3, there are two stacks containing entries, it being noted that two of the entries in the label interval W stack were deleted after they were extended. At subsequent processing time 4, the word path "to be" is extended to form an extended path "to be or" which is entered into a stack corresponding to label interval Y. Continuing the examination for additional labels, the path "to be or not to be . . . " is found to represent the most likely path or stack.

From the above example, it is observed that the stack decoder 1002 orders a plurality of stacks, each corresponding to a label interval. When the end of a word path is most likely at an ith label interval, the word path is entered into the stack corresponding to the ith label interval. The stack decoder 1002, in effect, serves to control the other elements but does not perform many computations. Hence, the stack decoder 1002 preferably includes a 4341 running under the IBM VM/370 operating system as described in publications such as *Virtual Machine/System Product Introduction Release* 3 (1983). The array processors which perform considerable computation have been implemented with Floating Point System (FPS) 190L's, which are commercially available.

Further details of the stack decoder 1002 are set forth below.

Figure 5:
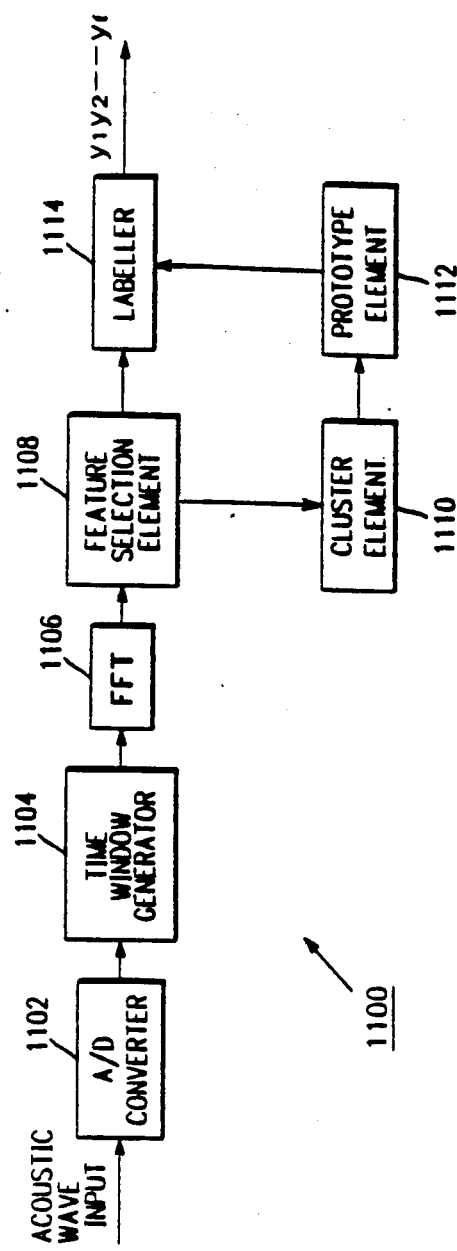
FIG. 5 is an illustration depicting the elements of an acoustic processor.

B. The Auditory Model and Implementation Thereof in an Acoustic Processor of a Speech Recognition System In FIG. 5 a specific embodiment of an acoustic processor 1100, as described above, is illustrated. An acoustic wave input (e.g., natural speech) enters an analog-to-digital converter 1102 which samples at a prescribed rate. A typical sampling rate is one sample every 50 microseconds. To shape the edges of the digital signal, a time window generator 1104 is provided. The output of the window 1104 enters a fast Fourier transform (FFT) element 1106 which provides a frequency spectrum output for each time window.

The output of the FFT element 1106 is then processed to produce labels $y_1 y_2-y_f$. Four elements—a feature selection element 1108, a cluster element 1110, a prototype element 1112, and a labeller 1114—coact to generate the labels. In generating the labels, prototypes are defined as points (or vectors) in the space based on selected features and acoustic inputs, are then characterized by the same selected features to provide corresponding points (or vectors), in space that can be compared to the prototypes.

Specifically, in defining the prototypes, sets of points are grouped together as respective clusters by cluster element 1110. Methods for defining clusters have been based on probability distributions—such as the Gaussian distribution—applied to speech. The prototype of each cluster—relating to the centroid or other characteristic of the cluster—is generated by the prototype element 1112. The generated prototypes and acoustic input—both characterized by the same selected features—enter the labeller 1114. The labeller 1114 performs a comparing procedure which results in assigning a label to a particular acoustic input.

The selection of appropriate features is a key factor in deriving labels which represent the acoustic (speech) wave input. The presently described acoustic processor includes an improved feature selection element 1108. In accordance with the present acoustic processor, an auditory model is derived and applied in an acoustic processor of a speech recognition system. In explaining the auditory model, reference is made to FIG. 6.

Figure 6:
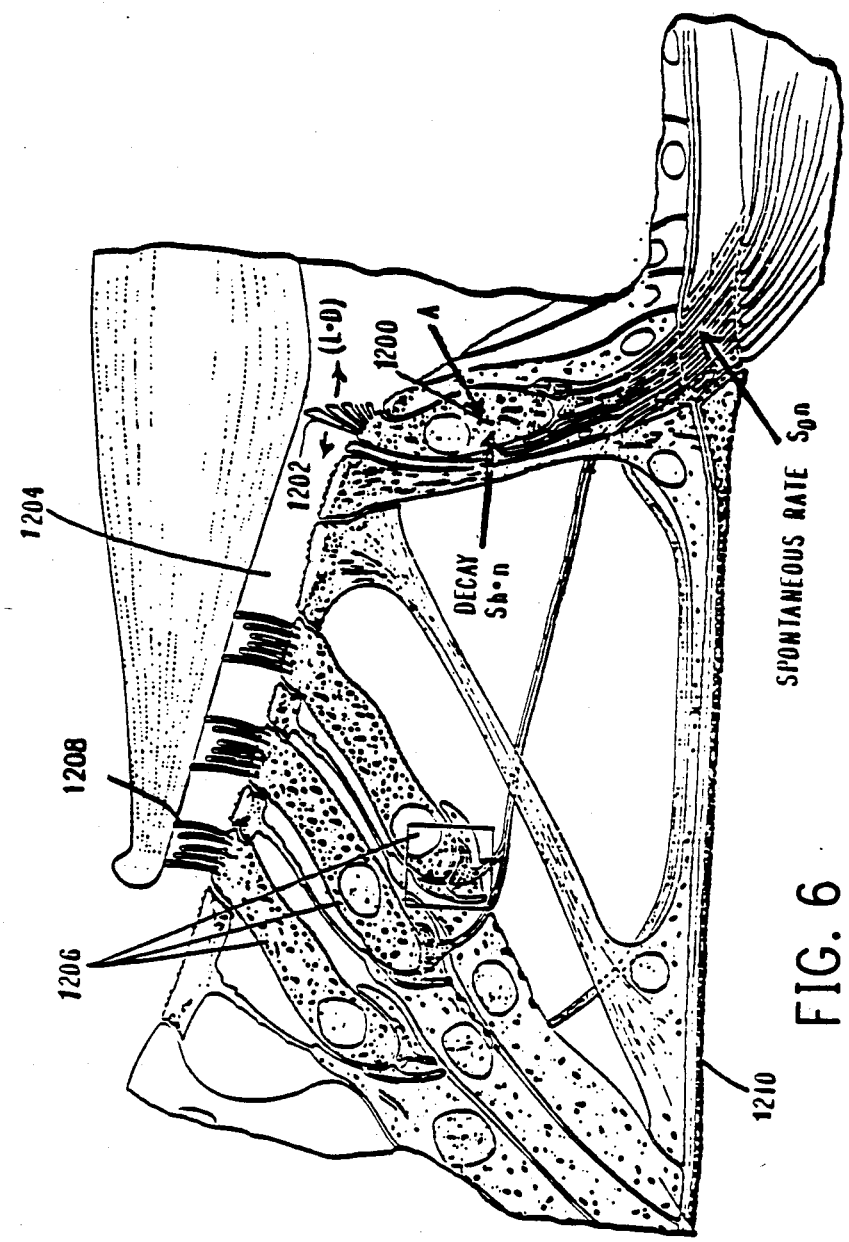
FIG. 6 is an illustration of a typical human ear indicating where components of an acoustic model are defined.

FIG. 6 shows part of the inner human ear. Specifically, an inner hair cell 1200 is shown with end portions 1202 extending therefrom into a fluid-containing channel 1204. Upstream from inner hair cells are outer hair cells 1206 also shown with end portions 1208 extending into the channel 1204. Associated with the inner hair cell 1200 and outer hair cells 1206 are nerves which convey information to the brain. Specifically, neurons undergo electrochemical changes which result in electrical impulses being conveyed along a nerve to the brain for processing. Effectuation of the electrochemical changes, is stimulated by the mechanical motion of the basilar membrane 1210.

It has been recognized, in prior teachings, that the basilar membrane 1210 serves as a frequency analyzer for acoustic waveform inputs and that portions along the basilar membrane 1210 respond to respective critical frequency bands. That different portions of the basilar membrane 1210 respond to corresponding frequency bands has an impact on the loudness perceived for an acoustic waveform input. That is, the loudness of tones is perceived to be greater when two tones are in different critical frequency bands than when two tones of similar power intensity occupy the same frequency band. It has been found that there are on the order of twenty-two critical frequency bands defined by the basilar membrane 1210.

Conforming to the frequency-response of the basilar membrane 1210, the present acoustic processor 1100 in its preferred form physically defines the acoustic waveform input into some or all of the critical frequency bands and then examines the signal component for each defined critical frequency band separately. This function is achieved by appropriately filtering the signal from the FFT element 1106 (see FIG. 5) to provide a separate signal in the feature selection element 1108 for each examined critical frequency band.

The separate inputs, it is noted, have also been blocked into time frames (of preferably 25.6 msec) by the time window generator 1104. Hence, the feature selection element 1108 preferably includes twenty-two signals—each of which represents sound intensity in a given frequency band for one frame in time after another.

Figure 7:
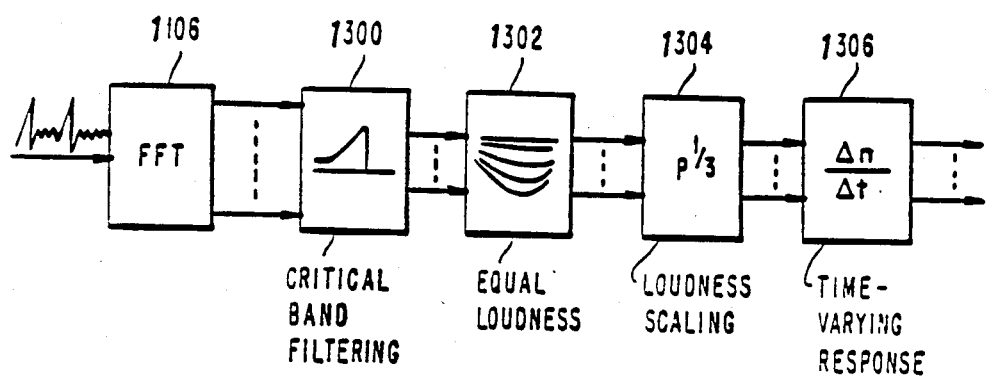
FIG. 7 is a block diagram showing portions of the acoustic processor.
Figure 8:
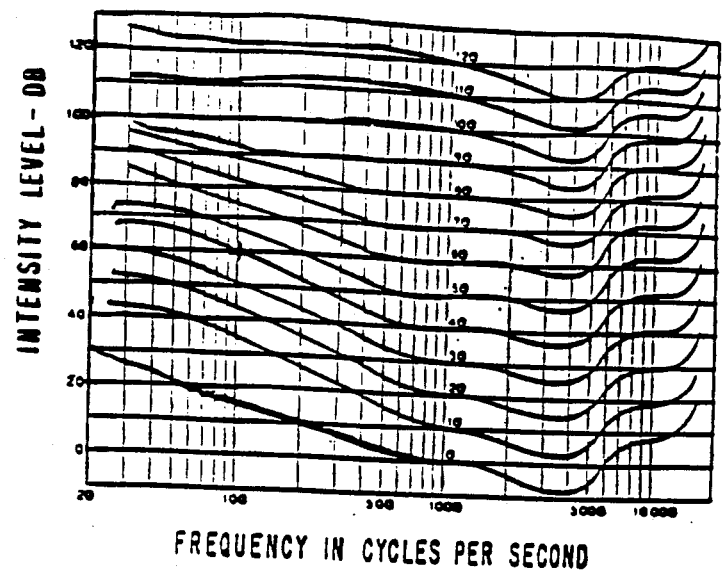
FIG. 8 is a graph showing sound intensity versus frequency, the graph being used in the design of the acoustic processor.

The filtering is preferably performed by a conventional critical band filter 1300 of FIG. 7. The separate signals are then processed by an equal loudness converter 1302 which accounts for perceived loudness variations as a function of frequency. In this regard, it is noted that a first tone at a given dB level at one frequency may differ in perceived loudness from a second tone at the same given dB level at a second frequency. The converter 1302 can be based on empirical data, converting the signals in the various frequency bands so that each is measured by a similar loudness scale. For example, the converter 1302 preferably map from acoustic power to equal loudness based on studies of Fletcher and Munson in 1933, subject to certain modifications. The modified results of these studies are depicted in FIG. 8. In accordance with FIG. 8, a 1 KHz tone at 40 dB is comparable in loudness level to a 100 Hz tone at 60 dB as shown by the X in the figure.

The converter 1302 adjusts loudness preferably in accordance with the contours of FIG. 8 to effect equal loudness regardless of frequency.

In addition to dependence on frequency, power changes and loudness changes do not correspond as one looks at a single frequency in FIG. 8. That is, variations in the sound intensity, or amplitude, are not at all points reflected by similar changes in perceived loudness. For example, at 100 Hz, the perceived change in loudness of a 10 dB change at about 110 dB is much larger than the perceived change in loudness of a 10 dB change at 20 dB. This difference is addressed by a loudness scaling element 1304 which compresses loudness in a predefined fashion. Preferably, the loudness scaling element compresses power P by a cube-root factor to $P^{\frac{1}{3}}$ by replacing loudness amplitude measure in phons by sones.

Figure 9:
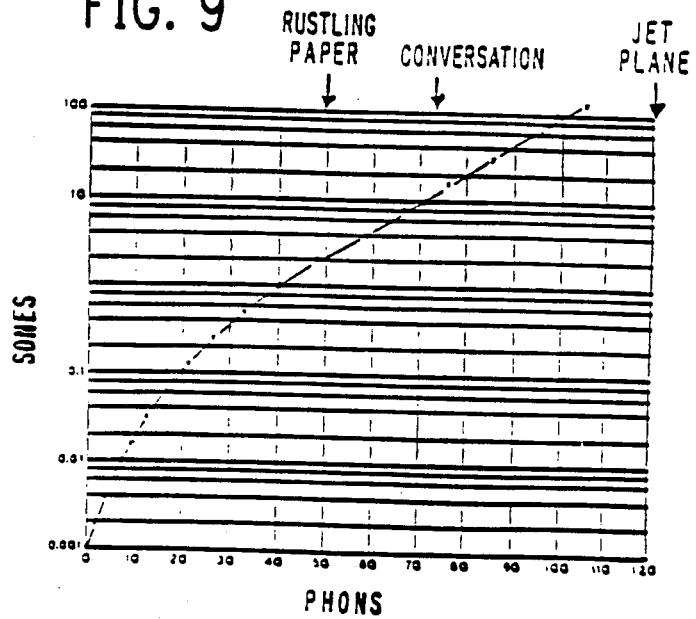
FIG. 9 is a graph showing the relationship between sones and phons.

FIG. 9 illustrates a known representation of phons versus sones determined empirically. By employing sones, the present model remains substantially accurate at large speech signal amplitudes. One sone, it should be recognized, has been defined as the loudness of a 1 KHz tone at 40 dB.

Referring again to FIG. 7, a novel time varying response element 1306 is shown which acts on the equal loudness, loudness scaled signals associated with each critical frequency band. Specifically, for each frequency band examined, a neural firing rate f is determined at each time frame. The firing rate f is defined in accordance with the present processor as:

$$f = (So - DL)n \tag{1}$$

where n is an amount of neurotransmitter; So is a spontaneous firing constant which relates to neural firings independent of acoustic waveform input; L is a measurement of loudness; and D is a displacement constant. (So)n corresponds to the spontaneous neural firing rate which occurs whether or not there is an acoustic wave input and DLn corresponds to the firing rate due to the acoustic wave input.

Significantly, the value of n is characterized by the present acoustic processor as changing over time according to the relationship:

$$dn/dt = Ao - (So + Sh + DL)n \tag{2}$$

where Ao is a replenishment constant and Sh is a spontaneous neurotransmitter decay constant. The novel relationship set forth in equation (2) takes into account that neurotransmitter is being produced at a certain rate (Ao) and is lost (a) through decay (Sh×n), (b) through spontaneous firing (So×n), and (c) through neural firing due to acoustic wave input (DL×n) The presumed locations of these modelled phenomena are illustrated in FIG. 6.

Equation (2) also reflects the fact that the present acoustic processor is non-linear in that the next amount of neurotransmitter and the next firing rate are dependent multiplicatively on the current conditions of at least the neurotransmitter amount. That is, the amount of neurotransmitter at a time $(t+\Delta t)$ is equal to the amount of neurotransmitter at a time t plus $dn/dt\Delta t$, or:

$$n(t+\Delta t) = n(t) + dn/dt\Delta t \tag{3}$$

Equations (1), (2), and (3) describe a time varying signal analyzer which, it is suggested, addresses the fact that the auditory system appears to be adaptive over time, causing signals on the auditory nerve to be non-linearly related to acoustic wave input. In this regard, the present acoustic processor provides the first model which embodies non-linear signal processing in a speech recognition system, so as to better conform to apparent time variations in the nervous system.

In order to reduce the number of unknowns in equations (1) and (2), the present acoustic processor uses the following equation (4) which applies to fixed loudness L:

$$So + Sh + DL = 1/T \tag{4}$$

T is a measure of the time it takes for an auditory response to drop to 37% of its maximum after an audio wave input is generated. T, it is noted, is a function of loudness and is, according to the present acoustic processor, derived from existing graphs which display the decay of the response for various loudness levels. That is, when a tone of fixed loudness is generated, it generates a response at a first high level after which the response decays toward a steady condition level with a time constant T. With no acoustic wave input, $T = T_0$ which is on the order of 50 msec. For a loudness of $L_{max}$, $T = T_{max}$ which is on the order of 30 msec. By setting Ao=1, 1/(So+Sh) is determined to be 5 csec, when L=0. When L is $L_{max}$ and $L_{max}$=20 sones, equation (5) results:

$$So + Sn + D(20) = 1/30 \tag{5}$$

With the above data and equations, So and Sh are defined by equations (6) and (7) as:

$$So = DL_{max}/(R + (DL_{max}T_oR) - 1) \tag{6}$$

$$Sh = 1/T_o - So \tag{7}$$

where $$R = \frac{f_{steady\ state}|L = L_{max}}{f_{steady\ state}|L = 0} \tag{8}$$

$f_{steady\ state}|$ represents the firing rate at a given loudness when dn/dt is zero.

R, it is noted, is the only variable left in the acoustic processor. Hence, to alter the performance of the processor, only R is changed. R, that is, is a single parameter which may be adjusted to alter performance which, normally, means minimizing steady state effects relative to transient effects. It is desired to minimize steady state effects because inconsistent output patterns for similar speech inputs generally result from differences in frequency response, speaker differences, background noise, and distortion which affect the steady state portions of the speech signal but not the transient portions. The value of R is preferably set by optimizing the error rate of the complete speech recognition system. A suitable value found in this way is R=1.5. Values of So and Sh are then 0.0888 and 0.11111 respectively, with D being derived as 0.00666.

Figure 10:
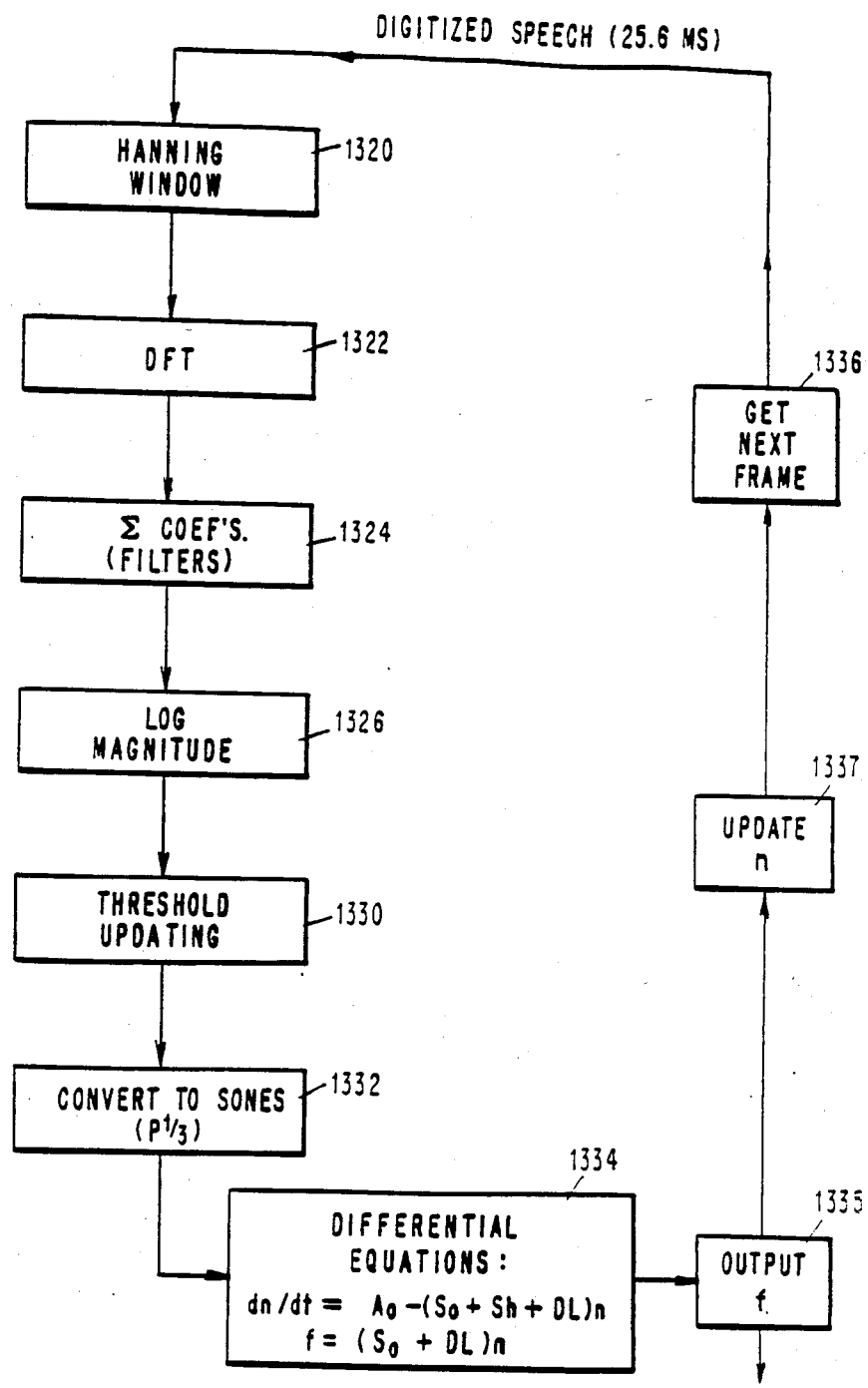
FIG. 10 is a flowchart representation showing how sound is characterized according to the acoustic processor of FIG. 5.

Referring to FIG. 10, a flowchart of the present acoustic processor is depicted. Digitized speech in a 25.6 msec time frame, sampled at preferably 20 KHz passes through a Hanning Window 1320 the output from which is subject to a Fourier Transform 1322, taken at preferably 10 msec intervals. The transform output is filtered by element 1324 to provide a power density output for each of at least one frequency band—preferably all the critical frequency bands or at least twenty thereof. The power density is then transformed from log magnitude 1326 to loudness level. This is readily performed according to the modified graph of FIG. 8. The process outlined hereafter which includes threshold up-dating of step 1330 is depicted in FIG. 11.

Figure 11:
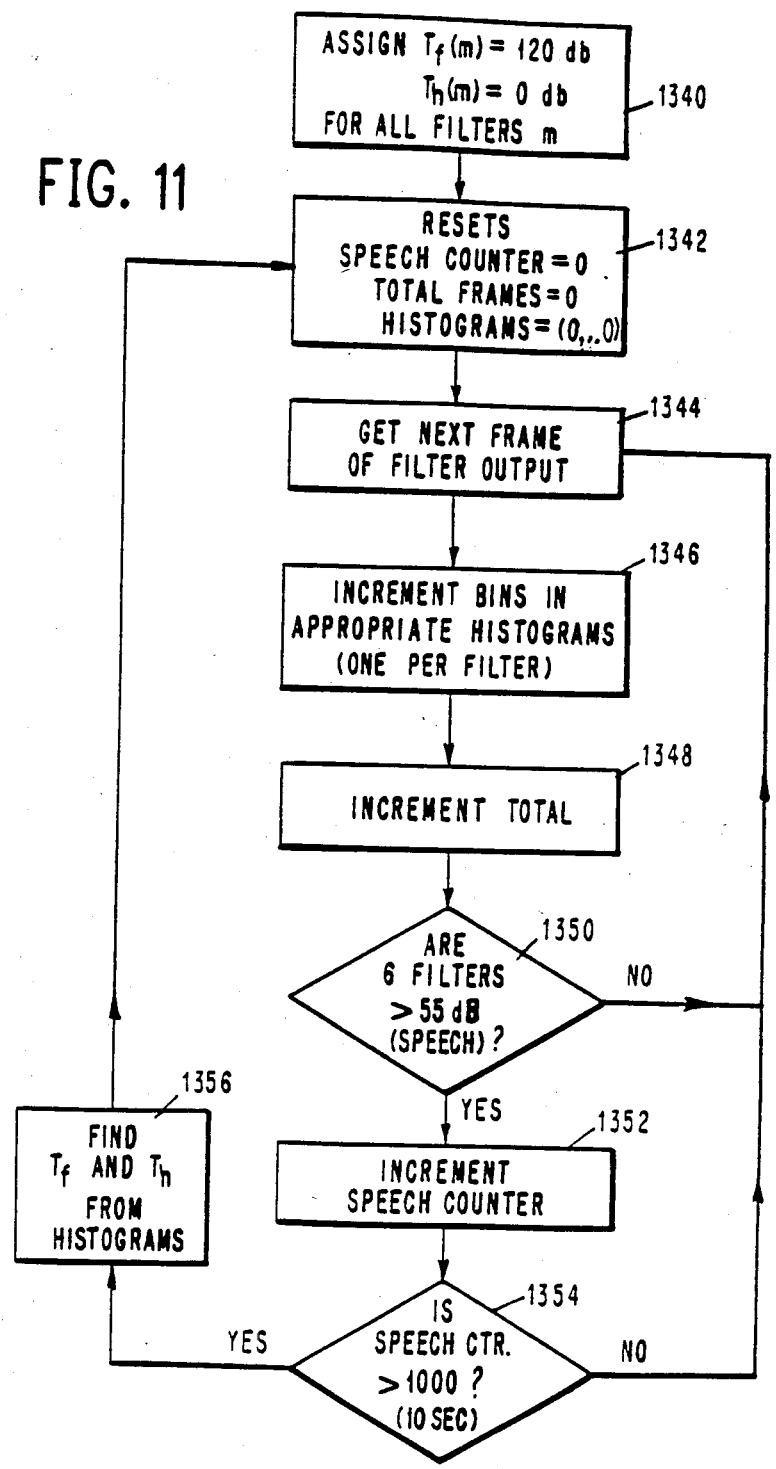
FIG. 11 is a flowchart representation showing how thresholds are up-dated in FIG. 10.

In FIG. 11, a threshold-of-feeling $T_f$ and a threshold-of-hearing $T_h$ are initially defined (at step 1340) for each filtered frequency band m to be 120 dB and 0 dB respectively. Thereafter, a speech counter, total frames register, and a histogram register are reset at step 1342.

Each histogram includes bins, each of which indicates the number of samples or counts during which power or some similar measure—in a given frequency band—is in a respective range. A histogram in the present instance preferably represents—for each given frequency band—the number of centiseconds during which loudness is in each of a plurality of loudness ranges. For example, in the third frequency band, there may be twenty centiseconds between 10 dB and 20 dB in power. Similarly, in the twentieth frequency band, there may be one hundred fifty out of a total of one thousand centiseconds between 50 dB and 60 dB. From the total number of samples (or centiseconds) and the counts contained in the bins, percentiles are derived.

A frame from the filter output of a respective frequency band is examined at step 1344 and bins in the appropriate histograms—one per filter—are incremented at step 1346. The total number of bins in which the amplitude exceeds 55 dB are summed for each filter (i.e. frequency band) at step 1348 and the number of filters indicating the presence of speech is determined. If there is not a minimum of filters (e.g. six of twenty) to suggest speech, the next frame is examined at step 1344. If there are enough filters to indicate speech at step 1350, a speech counter is incremented at step 1352. The speech counter is incremented at step 1352 until 10 seconds of speech have occurred at step 1354 whereupon new values for $T_f$ and $T_h$ are defined for each filter at step 1356.

The new $T_f$ and $T_h$ values are determined for a given filter as follows. For $T_f$, the dB value of the bin holding the 35th sample from the top of 1000 bins (i.e. the 96.5th percentile of speech) is defined as $BIN_H$. $T_f$ is then set as: $T_f = BIN_H + 40$ dB. For $T_h$, the dB value of the bin holding the (0.01) (TOTAL BINS−SPEECH COUNT) th value from the lowest bin is defined as $BIN_L$. That is, $BIN_L$ is the bin in the histogram which is 1% of the number of samples in the histogram excluding the number of samples classified as speech. $T_h$ is then defined as: $T_h = BIN_L - 30$ dB.

Returning to FIG. 10, the sound amplitudes are converted to sones and scaled based on the updated thresholds (steps 1330 and 1332) as described hereinbefore. An alternative method of deriving sones and scaling is by taking the filter amplitudes "a" (after the bins have been incremented) and converting to dB according to the expression:

$$a^{dB} = 20 \log_{10}(a) - 10 \qquad (9)$$

Each filter amplitude is then scaled to a range between 0 and 120 to provide equal loudness according to the expression:

$$a_{eql} = 120(a^{dB} - T_h)/(T_f - T_h) \qquad (10)$$

$A^{eql}$ is then preferably converted from a loudness level (phons) to an approximation of loudness in sones (with a 1 KHz signal at 40 dB mapping to (1) by the expression:

$$L^{dB} = (a^{eql} - 30)/4 \qquad (11)$$

Loudness in sones is then approximated as:

$$L_s(\text{appr}) = 10(L^{dB})/20 \qquad (12)$$

The loudness in sones $L_s$ is then provided as input to the equations (1) and (2) at step 1334 to determine the output firing rate f for each frequency band (step 1335). With twenty-two frequency bands, a twenty-two dimension vector characterizes the acoustic wave inputs over successive time frames. Generally, however, twenty frequency bands are examined by employing a conventional mel-scaled filter bank.

Prior to processing the next time frame (step 1336), the next state of n is determined in accordance with equation (3) in step 1337.

The acoustic processor hereinbefore described is subject to improvement in applications where the firing rate f and neurotransmitter amount n have large DC pedestals. That is, where the dynamic range of the terms of the f and n equations is important, the following equations are derived to reduce the pedestal height.

In the steady state, and in the absence of an acoustic wave input signal (L=0), equation (2) can be solved for a steady-state internal state n':

$$n' = A/(So + Sh) \qquad (13)$$

The internal state of the neurotransmitter amount n(t) can be represented as a steady state portion and a varying portion:

$$n(t) = n' + n''(t) \qquad (14)$$

Combining equations (1) and (14), the following expression for the firing rate results:

$$f(t) = (So + D \times L)(n' + n''(t)) \qquad (15)$$

The term $So \times n'$ is a constant, while all other terms include either the varying part of n or the input signal represented by ($D \times L$). Furture processing will involve only the squared differences between output vectors, so that constant terms may be disregarded. Including equation (13) for n', we get $$f'(t) = (So + D \times L) \times ((n''(t) + D \times L \times A)/(So + Sh)) \qquad (16)$$

Considering equation (3), the next state becomes:

$$n(t + \Delta t) = n'(t + \Delta t) + n''(t + \Delta t) \qquad (17)$$

$$= n''(t) + A - (So + Sh + D \times L) \times (n' + n''(t)) \qquad (18)$$

$$= n''(t) - (Sh \times n''(t)) - (So + Ao \times L^A)n''(t) - \qquad (19)$$

$$(Ao \times L^A \times D)/(So + Sh) + Ao - ((So \times Ao) + (Sn \times Ao))/(So + Sh)$$

This equation (19) may be rewritten, ignoring all constant terms, as:

$$n''(t + \Delta t) = n''(t)(1 - So\Delta t) - f'(t) \qquad (20)$$

Equations (15) and (20) now constitute the output equations and state-update equations applied to each filter during each 10 millisecond time frame. The result of applying these equations is a 20 element vector each 10 milliseconds, each element of the vector corresponding to a firing rate for a respective frequency band in the mel-scaled filter bank.

With respect to the embodiment set forth immediately hereinabove, the flowchart of FIG. 11 applies except that the equations for f, dn/dt, and n(t+1) are replaced by equations (11) and (16) which define special case expressions for firing rate f and next state n (t+Δt) respectively.

It is to be noted that the values attributed to the terms in the various equations (namely $t_o=5$ csec, $t_{Lmax}=3$ csec, $A_o=1$, $R=1.5$, and $L_{max}=20$) may be set otherwise and the terms So, Sh, and D may differ from the preferable derived values of 0.0888, 0.11111, and 0.00666, respectively, as other terms are set differently.

The present acoustic model has been practiced using the PL/I programming language with Floating Point Systems FPS 190L hardware, however may be practiced by various other software or hardware approaches.

C. Detailed Match

In FIG. 3, a sample detailed match phone machine 2000 is depicted. Each detailed match phone machine is a probabilistic finite-state machine characterized by (a) a plurality of states $S_i$, (b) a plurality of transitions $tr(S_j|S_i)$, some of the transitions extending between different states and some extending from a state back to itself, each transition having associated therewith a corresponding probability, and (c) for each label that can be generated at a particular transition, a corresponding actual label probability.

In FIg. 3, seven states $S_1$ through $S_7$ are provided and thirteen transitions tr1 through tr13 are provided in the detailed match phone machine 2000. A review of FIG. 3 shows that phone machine 2000 has three transitions with dashed line paths, namely transitions tr11, tr12, and tr13. At each of these three transitions, the phone can change from one state to another without producing a label and such a transition is, accordingly, referred to as a null transition. Along transitions tr1 through tr10 lables can be produced. Specifically, along each transition tr1 through tr10, one or more labels may have a distinct probability of being generated thereat. Preferably, for each transition there is a probability associated with each label that can be generated in the system. That is, if there are two hundred labels that can be selectively generated by the acoustic channel, each transition (that is not a null) has two hundred "actual label probabilities" associated therewith—each of which corresponds to the probability that a corresponding label is generated by the phone at the particular transition. The actual label probabilities for transition tr1 are represented by the symbol p followed by the bracketed column of numerals 1 through 200, each numeral representing a given label. For label 1, there is a probability p[1] t the detailed phone machine 2000 generates the label 1 at transition tr1. The various actual label probabilities are stored with relation to the label and a corresponding transition.

When a string of labels $y_1 y_2 y_3$ - - - is presented to a detailed match phone machine 2000 corresponding to a given phone, a match procedure is performed. The procedure associated with the detailed match phone machine is explained with reference to FIG. 12.

Figure 12:
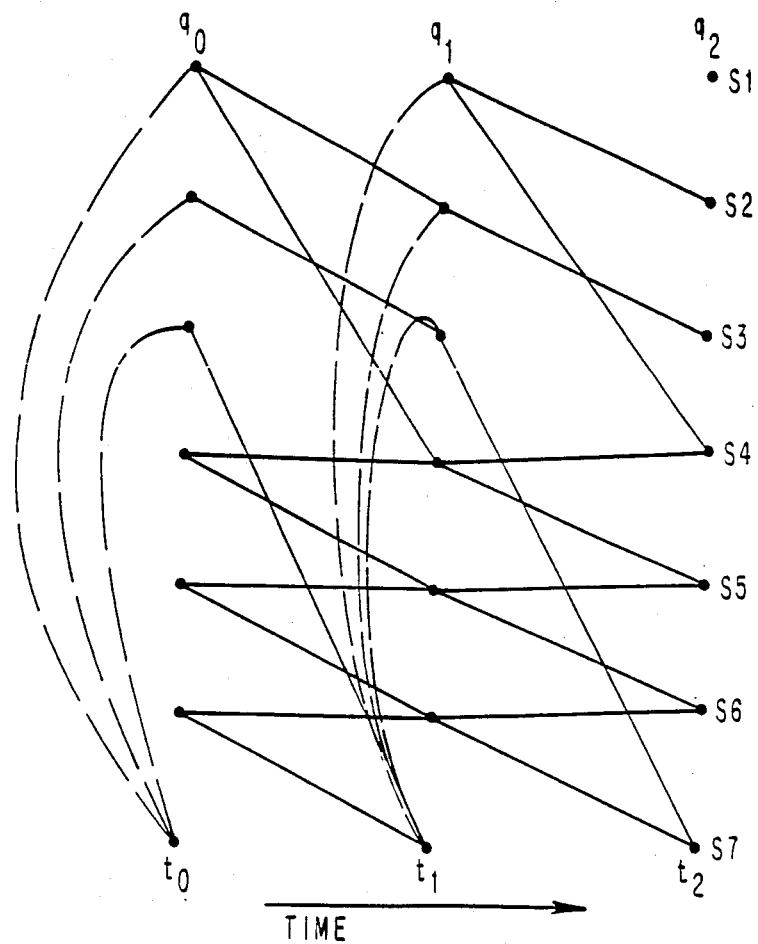
FIG. 12 is a trellis diagram, or lattice, of a detailed match procedure.

FIG. 12 is trellis diagram of the phone machine of FIG. 3. As in the phone machine, the trellis diagram shows a null transition from state $S_1$ to state $S_7$ and transitions from state $S_1$ to state $S_2$ and from state $S_1$ to state $S_4$. The transitions between other states are also illustrated. The trellis diagram also shows time measured in the horizontal direction. Start-time probabilities $q_0$ and $q_1$ represent the probabilities that a phone has a start time at time $t=t_0$ or $t=t_1$, respectively, for the phone. At each start time $t_0$ and $t_1$, the various transitions are shown. It should be noted, in this regard, that the interval between successive start (and end) times is preferably equal in length to the time interval of a label.

In employing the detailed match phone machine 2000 to determiane how closely a given phone matches the labels of an incoming string, an end-time distribution for the phone is sought and used in determining a match value for the phone. The notion of relying on the end-time distribution is common to all embodiments of phone machines discussed herein relative to a matching procedure. In generating the end-time distribution to perform a detailed match, the detailed match phone machine 2000 involves computations which are exact and complicated.

Looking at the trellis diagram of FIG. 12, we first consider the computations required to have both a start time and end time at time $t=t_0$. For this to be the case according to the example phone machine structure set forth in FIG. 3, the following probability applies:

$$Pr(S_7, t=t_0) = q_0 \times T(1 \to 7) + Pr(S_2, t=t_0) \times T(2 \to 7) + \cdots Pr(S_3, t=t_0) \times T(3 \to 7) \quad (21)$$

where Pr represents "probability of" and T represents the transition probability between the two parenthetically identified states. The above equation indicates the respective probabilities for the three conditions under which the end time can occur at time $t=t_0$. Moreover, it is observed that the end time at $t=t_0$ is limited in the current example to occurrence at state $S_7$.

Looking next at the end time $t=t_1$, it is noted that a calculation relating to every state other than state $S_1$ must be made. The state $S_1$ starts at the end time of the previous phone. For purposes of explanation, only the calculations pertaining to state $S_4$ are set forth.

For state $S_4$, the calculation is:

$$Pr(S_4, t=t_1) = Pr(S_1, t=t_0) \times T(1 \to 4) \times Pr(y_1 | 1 \to 4) + \cdots Pr(S_4, t=t_0) \times T(4 \to 4) \times Pr(y_1 | 4 \to 4) \quad (22)$$

In words, the equation (22) set forth immediately above indicates that the probability of the phone machine being in state $S_4$ at time $t=t_1$ is dependent on the sum of the following two terms (a) the probability of being at state $S_1$ at time $t=t_0$ multiplied by the probability (T) of the transition from state $S_1$ to state $S_4$ multiplied further by the probability (Pr) of a given label $y_1$ being generated given a transition from state $S_1$ to state $S_4$ and (b) the probability of being at state $S_4$ at time $t=t_0$ multiplied by the probability of the transition from state $S_4$ to itself and further multiplied by the probability of generating the given label $y_1$ during and given the transition from state $S_4$ to itself.

Similarly, calculations pertaining to the other states (excluding state $S_1$) are also performed to generate corresponding probabilities that the phone is at a particular state at time $t=t_1$. Generally, in determining the probability of being at a subject state at a given time, the detailed match (a) recognizes each previous state that has a transition which leads to the subject state and the respective probability of each such previous state; (b) recognizes, for each such previous state, a value representing the probability of the label that must be generated at the transition between each such previous state and the current state in order to conform to the label string; and (c) combines the probability of each previous state and the respective value representing the label probability to provide a subject state probability over a corresponding transition. The overall probability of being at the subject state is determined from the subject state probabilities over all transitions leading thereto. The calculation for state $S_7$, it it noted, includes terms relating to the three null transitions which permit the phone to start and end at time $t=t_1$ with the phone ending in state $S_7$.

As with the probability determinations relative to times $t=t_0$ and $t=t_1$, probability determinations for a series of other end times are preferably generated to form an end-time distribution. The value of the end-time distribution for a given phone provides an indication of how well the given phone matches the incoming labels.

In determining how well a word matches a string of incoming labels, the phones which represent the word are processed in sequence. Each phone generates an end-time distribution of probability values. A match value for the phone is obtained by summing up the end-time probabilities and then taking the logarithm of that sum. A start-time distribution for the next phone is derived by normalizing the end-time distribution by, for example, scaling each value thereof by dividing each value by the sum so that the sum of scaled values totals one.

It should be realized that there are at least two methods of determining h, the number of phones to be examined for a given word or word string. In a depth first method, computation is made along a baseform—computing a running subtotal with each successive phone. When the subtotal is found to be below a predefined threshold for a given phone position therealong, the computation terminates. Alternatively, in a breadth first method, a computation for similar phone positions in each word is made. The computations following the first phone in each word, the second phone in each word, and so on are made. In the breadth first method, the computations along the same number of phones for the various words are compared at the same relative phone positions therealong. In either method, the word(s) having the largest sum of match values is the sought object.

The detailed match has been implemented in APAL (Array Processor Assembly Language) which is the native assembler for the Floating Point Systems, Inc. 190L.

It should be recognized that the detailed match requires considerable memory for storing each of the actual label probabilities (i.e., the probability that a given phone generates a given label y at a given transition); the transition probabilities for each phone machine; and the probabilities of a given phone being at a given state at a given time after a defined start time. The above-noted FPS 190L is set up to make the various computations of end times, match values based on, for example, a sum—preferably the logarithmic sum of end time probabilities; start times based on the previously generated end time probabilities; and word match scores based on the match values for sequential phones in a word. In addition, the detailed match preferably accounts for "tail probabilities" in the matching procedure. A tail probability measures the likelihood of successive labels without regard to words. In a simple embodiment, a given tail probability corresponds to the likelihood of a label following another label. This likelihood is readily determined from strings of labels generated by, for example, some sample speech.

Hence, the detailed match provides sufficient storage to contain baseforms, statistics for the Markov models, and tail probabilities. For a 5000 word vocabulary where each word comprises approximately ten phones, the baseforms have a memory requirement of $5000 \times 10$. Where there are 70 distinct phones (with a Markov model for each phone) and 200 distinct labels and ten transitions at which any label has a probability of being produced, the statistics would require $70 \times 10 \times 200$ locations. However, it is preferred that the phone machines are divided into three portions—a start portion, a middle portion, and an end portion—with statistics corresponding thereto. (The three self-loops are preferably included in successive portions.) Accordingly, the storage requirements are reduced to $70 \times 3 \times 200$. With regard to the tail probabilities, $200 \times 200$ storage locations are needed. In this arrangement, 50K integer and 82K floating point storage performs satisfactorily.

It should be noted that the detailed match may be implemented by using fenemic, rather than phonetic, phones. A fenemic phone is preferably a two-state Markov model having a non-null transition from the first state back to itself, a non-null transition from the first state to the second, and a null transition (at which there is no label produced) from the first state to the second state. Instead of corresponding to a phonetic element, each phone machine corresponds to one of the 200 fenemes in the fenemic alphabet. Each transition in a phone machine corresponding to a given feneme has a probability associated therewith and at each non-null transition there are a plurality of label probabilities. Each label probability corresponds to the probability of the given feneme producing a particular label (or feneme) at a corresponding transition. These statistics are derived during a training period in which known words or sounds—represented by a known sequence of fenemic phones—are uttered. The labels generated during training are used in filling the fenemic phones with statistics. Appendix 1 provides a program listing that corresponds to the main computational kernel of a fenemic detailed match. The routine in Appendix 1 extends a lattice—which corresponds to a fenemic baseform of a current word—forward in time by a single time step. The subroutine EXTLOOP is the main loop. Therebefore, the pipeline is started up and partial computations needed for the main loop are performed. After the main loop, partial computations remaining in the computational pipeline are emptied.

D. Basic Fast Match

Because the detailed match is computationally expensive, a basic fast match and an alternative fast match which reduces the computation requirements without some moderate sacrifice in accuracy. The fast match is preferably used in conjunction with the the detailed match, the fast match listing likely candidate words from the vocabulary, and the detailed match being performed on, at most, the candidate words on the list.

A fast approximate acoustic matching technique is the subject of the co-pending patent application entitled "Apparatus and Method of Performing Acoustic Matching". In the fast approximate acoustic match, preferably each phone machine is simplified by replacing the actual label probability for each label at all transitions in a given phone machine with a specific replacement value. The specific replacement value is preferably selected so that the match value for a given phone when the replacement values are used is an overestimation of the match value achieved by the detailed match when the replacement values do not replace the actual label probabilities. One way of assuring this condition is by selecting each replacement value so that no probability corresponding to a given label in a given phone machine is greater than the replacement value thereof. By substituting the actual label probabilities in a phone machine with corresponding replacement values, the number of required computations in determining a match score for a word is reduced greatly. Moreover, since the replacement value is preferably an overestimation, the resulting match score is not less than would have previously been determined without the replacement.

In a specific embodiment of performing an acoustic match in a linguistic decoder with Markov models, each phone machine therein is characterized—by training—to have (a) a plurality of states and transition paths between states, (b) transitions $tr(S_j|S_i)$ having probabilities $T(i \rightarrow j)$ each of which represents the probability of a transition to a state $S_j$ given a current state $S_i$ where $S_i$ and $S_j$ may be the same state or different states, and (c) actual label probabilities wherein each actual label probability $p(y_k|i \rightarrow j)$ indicates the probability that a label $y_k$ is produced by a given phone machine at a given transition from one state to a subsequent state where k is a label identifying notation; each phone machine including (a) means for assigning to each $y_k$ in said each phone machine a single specific value $p'(y_k)$ and (b) means for replacing each actual output probability $p(y_k|i \rightarrow j)$ at each transition in a given phone machine by the single specific value $p'(y_k)$ assigned to the corresponding $y_k$. Preferably, the replacement value is at least as great as the maximum actual label probability for the corresponding $y_k$ label at any transition in a particular phone machine. The fast match embodiments are employed to define a list of on the order of ten to one hundred candidate words selected as the most likely words in the vocabulary to correspond to the incoming labels. The candidate words are preferably subjected to the language model and to the detailed match. By paring the number of words considered by the detailed match to on the order of 1% of the words in the vocabulary, the computational cost is greatly reduced while accuracy is maintained.

The basic fast match simplifies the detailed match by replacing with a single value the actual label probabilities for a given label at all transitions at which the given label may be generated in a given phone machine. That is, regardless of the transition in a given phone machine whereat a label has a probability of occurring, the probability is replaced by a single specific value. The value is preferably an overestimate, being at least as great as the largest probability of the label occurring at any transition in the given phone machine.

By setting the label probability replacement value as the maximum of the actual label probabilities for the given label in the given phone machine, it is assured that the match value generated with the basic fast match is at least as high as the match value that would result from employing the detailed match. In this way, the basic fast match typically overestimates the match value of each phone so that more words are generally selected as candidate words. Words considered candidates according to the detailed match also pass muster in accordance with the basic fast match.

Figure 13:
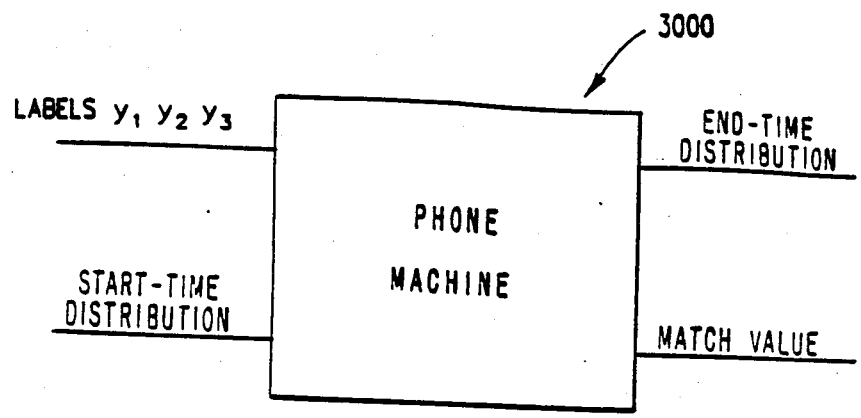
FIG. 13 is a diagram depicting a phone machine used in performing matching.

Referring to FIG. 13, a phone machine 3000 for the basic fast match is illustrated. Labels (also referred to as symbols and fenemes) enter the basic fast match phone machine 3000 together with a start-time distribution. The start-time distribution and the label string input is like that entering the detailed match phone machine described hereinabove. It should be realized that the start time may, on occasion, not be a distribution over a plurality of times but may, instead, represent a precise time—for example following an interval of silence—at which the phone begins. When speech is continuous, however, the end-time distribution is used to define the start-time distribution (as is discussed in greater detail hereinbelow). The phone machine 400 generates an end-time distribution and a match value for the particular phone from the generated end-time distribution. The match score for a word is defined as the sum of match values for component phones—at least the first h phones in the word.

Figure 14:
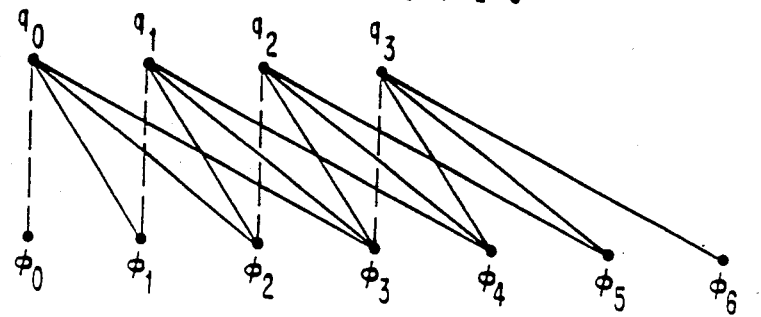
FIG. 14 is a time distribution diagram used in a matching procedure having certain imposed conditions.

Referring now to FIG. 14, a diagram of a basic fast match computation is illustrated. The basic fast match computation is only concerned with the start-time distribution, the number—or length of labels—produced by the phone, and the replacement values $p'_{y_k}$ associated with each label $y_k$. By substituting all actual label probabilities for a given label in a given phone machine by a corresponding replacement value, the basic fast match replaces transition probabilities with length distribution probabilities and obviates the need for including actual label probabilities (which can differ for each transition in a given phone machine) and probabilities of being at a given state at a given time.

In this regard, the length distributions are determined from the detailed match model. Specifically, for each length in the length distribution, the procedure preferably examines each state individually and determines for each state the various transition paths by which the currently examined state can occur (a) given a particular label length and (b) regardless of the outputs along the transitions. The probabilities for all transition paths of the particular length to each subject state are summed and the sums for all the subject states are then added to indicate the probability of a given length in the distribution. The above procedure is repeated for each length. In accordance with the preferred form of the matching procedure, these computations are made with reference to a trellis diagram as is known in the art of Markov modelling. For transition paths which share branches along the trellis structure, the computation for each common branch need be made only once and is applied to each path that includes the common branch.

In the diagram of FIG. 14, two limitations are included by way of example. First, it is assumed that the length of labels produced by the phone can be zero, one, two, or three having respective probabilities of $l_0, l_1, l_2,$ and $l_3$. The start time is also limited, permitting only four start times having respective probabilities of $q_0, q_1, q_2,$ and $q_3$. With these limitations, the following equations define the end-time distribution of a subject phone as:

$$\Phi_0 = q_0 l_0$$

$$\Phi_1 = q_1 l_0 + q_0 l_1 p_1$$

$$\Phi_2 = q_2 l_0 + q_1 l_1 p_2 + q_0 l_2 p_1 p_2$$

$$\Phi_3 = q_3 l_0 + q_2 l_1 p_3 + q_1 l_2 p_2 p_3 + q_0 l_3 p_1 p_2 p_3$$

$$\Phi_4 = q_3 l_1 p_4 + q_2 l_2 p_3 p_4 + q_1 l_3 p_2 p_3 p_4$$

$$\Phi_5 = q_3 l_2 p_4 p_5 + q_2 l_3 p_3 p_4 p_5$$

$$\Phi_6 = q_3 l_3 p_4 p_5 p_6$$

In examining the equations, it is observed that $\Phi_3$ includes a term corresponding to each of four start times. The first term represents the probability that the phone starts at time $t=t_3$ and produces a length of zero labels—the phone starting and endig at the same time. The second term represents the probability that the phone starts at time $t=t_2$, that the length of labels is one, and that a label 3 is produced by the phone. The third term represents the probability that the phone starts at time $t=t_1$, that the length of labels is two (namely labels 2 and 3), and that labels 2 and 3 are produced by the phone. Similarly, the fourth term represents the probability that the phone starts at time $t=t_0$; that the length of labels is three; and that the three labels 1, 2, and 3 are produced by the phone.

Comparing the computations required in the basic fast match with those required by the detailed match suggest the relative simplicity of the former relative to the latter. In this regard, it is noted that the $p'_{yk}$ value remains the same for each appearance in all the equations as do the label length probabilities. Moreover, with the length and start time limitations, the computations for the later end times become simpler. For example, at $\Phi_6$, the phone must start at time $t=t_3$ and all three labels 4, 5, and 6 must be produced by the phone for that end time to apply.

In generating a match value for a subject phone, the end time probabilities along the defined end-time distribution are summed. If desired, the log of the sum is taken to provide the expression:

$$\text{match value} = \log_{10}(\Phi_0 + \cdots + \Phi_6)$$

As noted previously, a match score for a word is readily determined by summing the match values for successive phones in a particular word.

Figure 15:
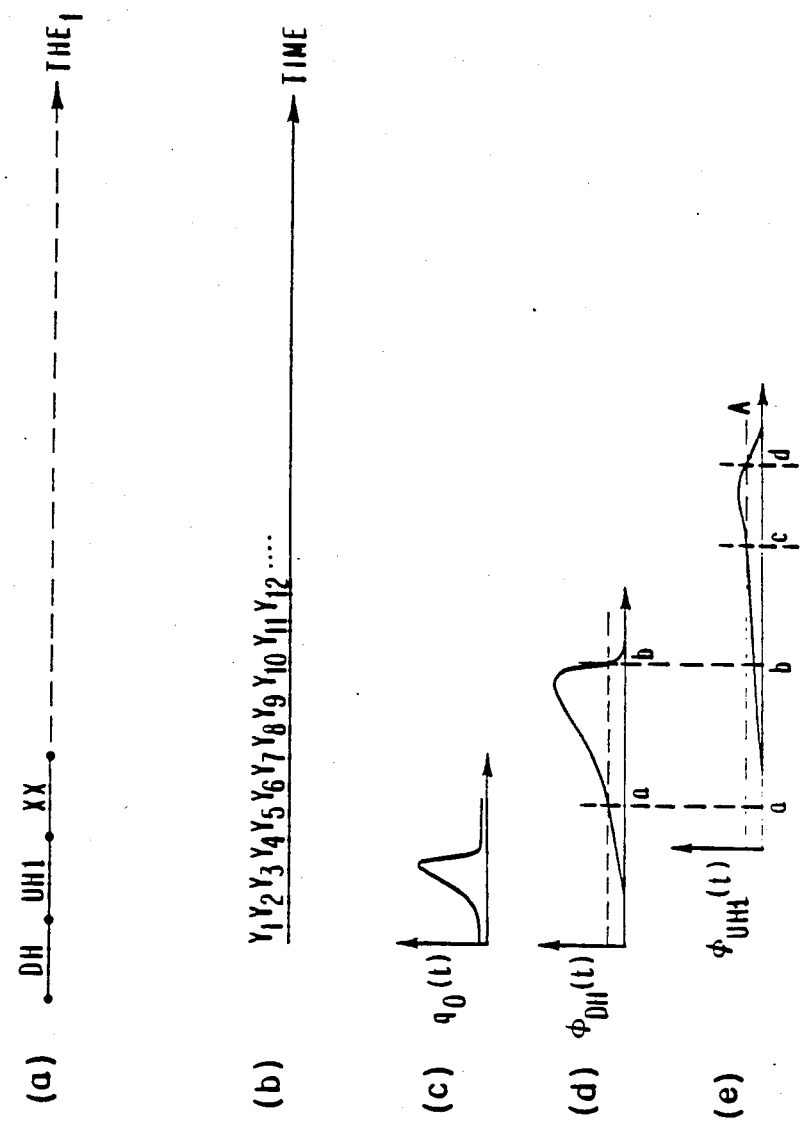
FIGS. 15(a) through (e) are diagrams which show the interrelationship between phones, a label string, and start and end times determined in the matching procedure.

In describing the generating of the start time distribution, reference is made to FIG. 15. In FIG. 15(a), the word THE$_1$ is reported, broken down into its component phones. In FIG. 15(b), the string of labels is depicted over time. In FIG. 15(c), a first start-time distribution is shown. The first start-time distribution has been derived from the end-time distribution of the most recent previous phone (in the previous word which may include a "word" of silence). Based on the label inputs and the start-time distribution of FIG. 15(c), the end-time distribution for the phone DH, $\Phi_{DH}$, is generated. The start-time distribution for the next phone, UH1, is determined by recognizing the time during which the previous phone end-time distribution exceeded a threshold (A) in FIG. 15(d). (A) is determined individually for each end-time distribution. Preferably, (A) is a function of the sum of the end-time distribution values for a subject phone. The interval between times a and b thus represents the time during which the start-time distribution for the phone UH1 is set. (See FIG. 15(e).) The interval between times c and d in FIG. 15(e) corresponds to the times between which the end-time distribution for the phone DH exceeds the threshold (A) and between which the start-time distribution of the next phone is set. The values of the start-time distribution are obtained by normalizing the end-time distribution by, for example, dividing each end-time value by the sum of the end-time values which exceed the threshold (A).

The basic fast match phone machine 3000 has been implemented in a Floating Point Systems Inc. 190L with an APAL program. Other hardware and software may also be used to develop a specific form of the matching procedure by following the teachings set forth herein.

E. Alternative Fast Match

The basic fast match employed alone or, preferably, in conjunction with the detailed match and/or a language model greatly reduces computation requirements. To further reduce computational requirements, the present teachings further simplifies the detailed match defining a uniform label length distribution between two lengths—a minimum length $L_{min}$ and a maximum length $L_{max}$. In the basic fast match, the probabilities of a phone generating labels of a given length—namely $l_0$, $l_1$, $l_2$, etc.—typically have differing values. According to the alternative fast match, the probability for each length of labels is replaced by a single uniform value.

Preferably, the minimum length is equal to the smallest length having a nonzero probability in the original length distribution, although other lengths may be selected if desired. The selection of the maximum length is more arbitrary than the selection of the minimum length, but is significant in that the probability of lengths less than the minimum and greater than the maximum are set as zero. By defining the length probability to exist between only the minimum length and the maximum length, a uniform pseudo-distribution can be set forth. In one approach, the uniform probability can be set as the average probability over the pseudo-distribution. Alternatively, the uniform probability can be set as the maximum of the length probabilities that are replaced by the uniform value.

The effect of characterizing all the label length probabilities as equal is readily observed with reference to the equations set forth above for the end-time distribution in the basic fast match. Specifically, the length probabilities can be factored out as a constant.

With $L_{min}$ being set at zero and all length probabilities being replaced by a single constant value, the end-time distribution can be characterized as:

$$\theta_m = \Phi_m/1 = q_m + \theta_{m-1} p_m$$

where "1" is the single uniform replacement value and where the value for $p_m$ corresponds preferably to the replacement value for a given label being generated in the given phone at time m.

For the above equation for $\theta_m$, the match value is defined as:

$$\text{match value} = \log_{10}(\theta_0 + \theta_1 + \cdots + \theta_m) + \log_{10} \quad (1)$$

In comparing the basic fast match and the alternative fast match, it has been found that the number of required additions and multiplications are greatly reduced by employing the alternative fast match phone machines. With $L_{min}=0$, it has been found that the basic fast match requires forty multiplications and twenty additions in that the length probabilities must be considered. With the alternative fast match, $\theta_m$ is determined recursively and requires one multiplication and one addition for each successive $\theta_m$.

To further illustrate how the alternative fast match simplifies computations, FIG. 16 and FIG. 17 are provided.

In FIG. 16(a), a phone machine embodiment 3100 corresponding to a minimum length $L_{min}=0$ is depicted. The maximum length assumed to be infinite so that the length distribution may be characterized as uniform. In FIG. 16(b), the trellis diagram resulting from the phone machine 3100 is shown. Assuming that start times after $q_n$ are outside the start-time distribution, all determinations of each successive $\theta_m$ with $m<n$ require one addition and one multiplication. For determinations of end times thereafter, there is only one required multiplication and no additions.

In FIG. 17, $L_{min}=4$. FIG. 17(a) illustrates a specific embodiment of a phone machine 3200 therefor and FIG. 17(b) shows a corresponding trellis diagram. Because $L_{min}=4$, the trellis diagram of FIG. 17(b) has a zero probability along the paths marked u, v, w, and z. For those end times which extend between $\theta_4$ and $\theta_n$, it is noted that four multiplications and one addition is required. For end times greater than $n+4$, one multiplication and no additions are required. This embodiment has been implemented in APAL code on a FPS 190L.

In Appendix 2, a program listing corresponding to the main computational kernel of the fast (approximate) match is provided. The fast match in the listing is based on phonetic, rather than fenemic, baseforms. The code corresponds to the case where $L_{min}=4$.

It should be noted that additional states may be added to the FIG. 16 or FIG. 17 embodiments as desired.

F. Matching Based On First J Labels

As a further refinement to the basic fast match and alternative fast match, it is contemplated that only the first J labels of a string which enters a phone machine be considered in the match. Assuming that labels are produced by the acoustic processor of an acoustic channel at the rate of one per centisecond, a reasonable value for J is one hundred. In other words, labels corresponding to on the order of one second of speech will be provided to determine a match between a phone and the labels entering the phone machine. By limiting the number of labels examined, two advantages are realized. First, decoding delay is reduced and, second, problems in comparing the scores of short words with long words are substantially avoided. The length of J can, of course, be varied as desired.

The effect of limiting the number of labels examined can be noted with reference to the trellis diagram of FIG. 17(b). Without the present refinement, the fast match score is the sum of the probabilities of $\theta_m$'s along the bottom row of the diagram. That is, the probability of being at state $S_4$ at each time starting at $t=t_0$ (for $L_{min}=0$) or $t=t_4$ (for $L_{min}=4$) is determined as a $\theta_m$ and all $\theta_m$'s are then totalled. For $L_{min}=4$, there is no probability of being in state $S_4$ at any time before $t_4$. With the refinement, the summing of $\theta_m$'s terminates at time J. In FIG. 17(b), time J corresponds to time $t_{n+2}$.

Terminating the examination of J labels over J time intervals can result in the following two probability summations in determining a match score. First, as described hereinbefore, there is a row calculation along the bottom row of the trellis diagram but only up to the time $J-1$. The probabilities of being in state $S_4$ at each time up to time $J-1$ are summed to form a row score. Second, there is a column score which corresponds to the sum of probabilities that the phone is at each respective state $S_0$ through $S_4$ at time J. That is, the column score is:

$$\text{column score} = \Sigma_{f=0}^{4} \Pr(S_f, J)$$

The match score for a phone is obtained by summing the row score and column score and then taking the logarithm of that sum. To continue the fast match for the next phone, the values along the bottom row—preferably including time J—are used to derive the nexe phone start-time distribution.

After determining a match score for each of b consecutive phones, the total for all phones is, as before noted, the sum of the match scores for all the phones.

In examining the manner in which the end-time probabilities are generated in the basic fast match and alternative fast match embodiments set forth above, it is noted that the determination of column scores does not conform readily to the fast match computations. To better adapt the refinement of limiting the number of labels examined to the fast match and alternative match, the present matching technique provides that the column score be replaced by an additional row score. That is, an additional row score is determined for the phone being at state $S_4$ (in FIG. 17(b)) between times J and $J+K$ where K is the maximum number of states in any phone machine. Hence, if any phone machine has ten states, the present refinement adds ten end times along the bottom row of the trellis for each of which a probability is determined. All the probabilities along the bottom row up to and including the probability at time $J+K$ are added to produce a match score for the given phone. As before, consecutive phone match values are summed to provide a word match score.

This embodiment has been implemented in APAL code on a FPS 190L; however as with other portions of the system may be implemented with other codes on other hardware.

G. Phone Tree Structure and Fast Match Embodiments

By employing the basic fast match or alternative fast match—with or without the maximum label limitation—the computational time required in determining phone match values is tremendously reduced. In addition, the computational savings remain high even when the detailed match is performed on the words in the fast match derived list.

Figure 18:
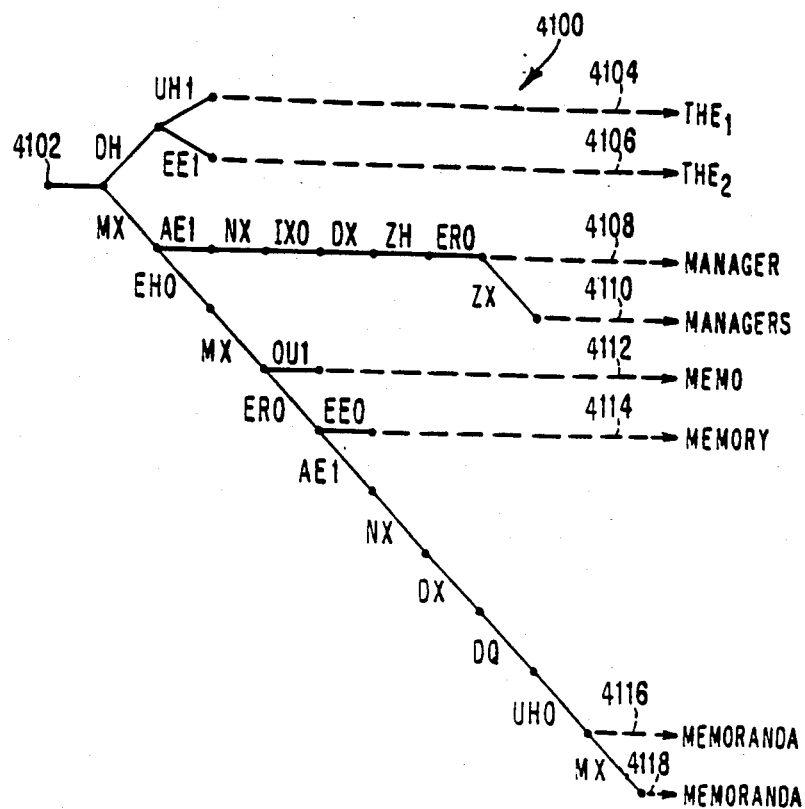
FIG. 18 is a diagram illustrating a tree structure of phones which permit processing of multiple words simultaneously.

The phone match values, once determined, are compared along the branches of a tree structure 4100 as shown in FIG. 18 to determine which paths of phones are most probable. In FIG. 18, the phone match values for DH and UH1 (emanating from point 4102 to branch 4104) should sum to a much higher value for the spoken word "the" than the various sequences of phones branching from the phone MX. In this regard, it should be observed that the phone match value of the first MX phone is computed only once and is then used for each baseform extending therefrom. (See branches 4104 and 4106). In addition, when the total score calculated along a first sequence of branches is found to be much lower than a threshold value or much lower than the total score for other sequences of branches, all baseforms extending from the first sequence may be simultaneously eliminated as candidate words. For example, baseforms associated with branches 4108 through 4118 are simultaneously discarded when it is determined that MX is not a likely path.

With the fast match embodiments and the tree structure, an ordered list of candidate words is generated with great computational savings. The fast match, it should be noted, is applicable to fenemic baseforms as well as phonetic baseforms, the difference being that the estimated label probabilities are assigned to only two transitions in a fenemic phone. The tree structure is not, however, intended for use with fenemic baseforms.

With regard to storage requirements, it is noted that the tree structure of phones, the statistics for the phones, and tail probabilities are to be stored. With regard to the tree structure, there are 25000 arcs and four datawords characterizing each arc. The first dataword represents an index to successor arcs or phones. The second dataword indicates the number of successor phones along the branch. The third dataword indicates at which node in the tree the arc is located. And the fourth dataword indicates the current phone. Hence, for the tree structure, 25000×4 storage spaces are required. In the fast match, there are 100 distinct phones and 200 distinct fenemes. In that a feneme has a single probability of being produced anywhere in a phone, storage for 100×200 statistical probabilities is required. Finally, for the tail probabilties, 200×200 storage spaces are required. 100K integer and 60K floating point storage is sufficient for the fast match.

H. Language Model

As noted previously, a language model which stores information—such as tri-grams—relating to words in context may be included to enhance the probability of a correct word selection. Language models have been reported in the literature.

The language model 1010, preferably, has a unique character. Specifically, a modified tri-gram method is used. In accordance with this method, a sample test is examined to determine the likelihood of each ordered triplet of words, ordered pair of words, or single words in the vocabulary. A list of the most likely triplets of words and a list of the most likely pairs of words are formed. Moreover, the likelihood of a triplet not being in the triplet list and the likelihood of a pair not being in the pair list are respectively.

In accordance with the language model, when a subject word follows tow words, a determination is made as to whether the subject word and the two preceding words are on the triplet list. If so, the stored probability assigned to the triplet is indicated. If the subject word and its two predecessors are not on the triplet list, a determination is made as to whether the subject word and its adjacent predecessor are on the pair list. If so, the probability of the pair is multiplied by the probability of a triplet not being on the triplet list, the product then being assigned to the subject word. If the subject word and its predecessor(s) are not on the triplet list or pair list, the probability of the subject word alone is multiplied by the likelihood of a triplet not being on the triplet list and by the probability of a pair not being on the pair list. The product is then assigned to the subject word.

J. Forming Trained Word Baseforms

Figure 19:
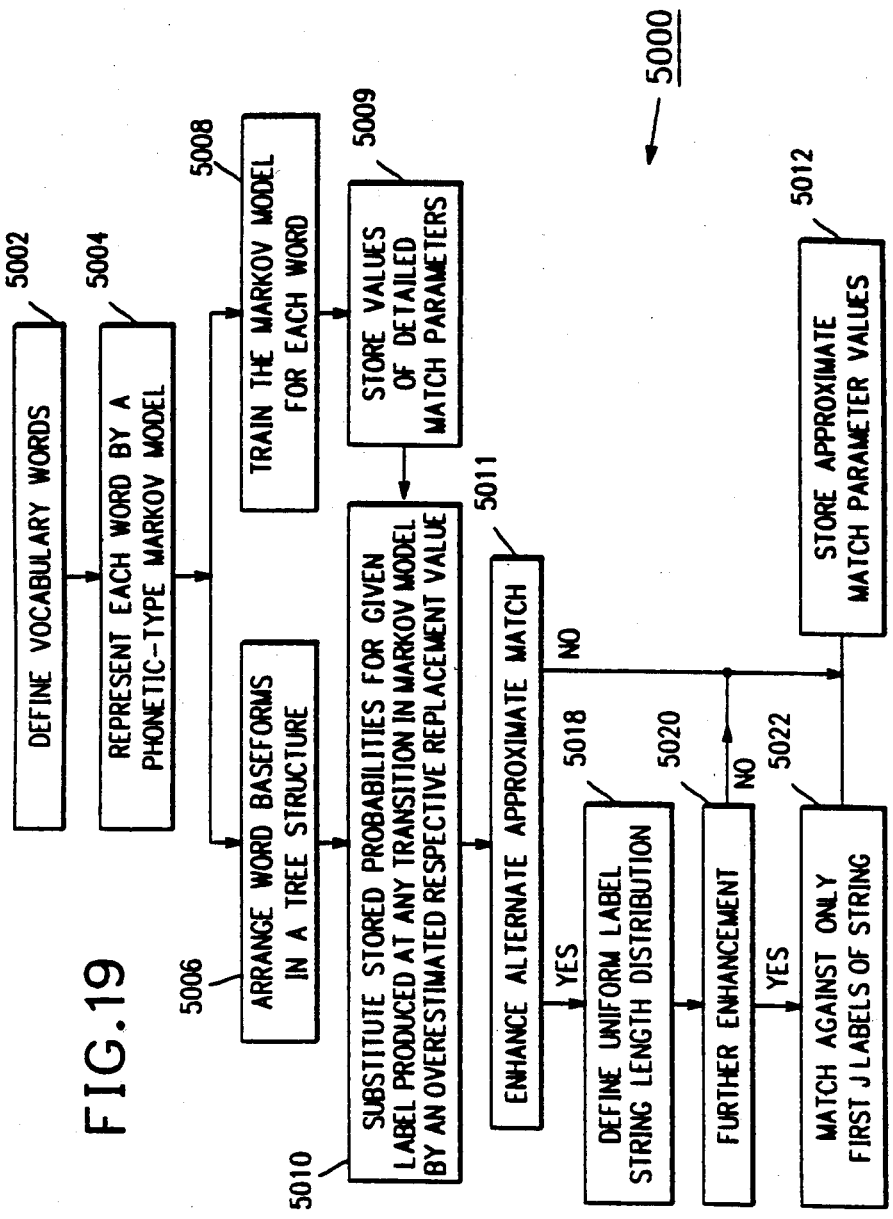
FIG. 19 is a flowchart outlining the steps performed in forming trained word baseforms.

Referring to FIG. 19, a flowchart 5000 illustrating the training of phone machines employed in acoustic matching is shown. At step 5002, a vocabulary of words—typically on the order of 5000 words—is defined. Each word is then represented by a sequence of phone machines. The phone machines have been, by way of example, been shown as phonetic-type phone machines but may, alternatively, comprise a sequence of fenemic phones. Representing words by a sequence of phonetic-type phone machines or by a sequence of fenemic phone machines is discussed hereinbelow. A phone machine sequence for a word is referred to as a word baseform.

In step 5006, the word baseforms are arranged in the tree structure described hereinabove. The statistics for each phone machine in each word baseform are determined by training according to the well-known forward-backward algorithm set forth in the article "Continuous Speech Recognition by Statistical Methods" by F. Jelinek (step 5008).

At step 5009, values to be substituted for actual parameter values or statistics used in the detailed match are determined. For example, the values to be substituted for the actual label output probabilities are determined. In step 5010, the determined values replace the stored actual probabilities so that the phones in each word baseform include the approximate substitute values. All approximations relating to the basic fast match are performed in step 5010.

A decision is then made as to whether the acoustic matching is to be enhanced (step 5011). If not, the values determined for the basic approximate match are set for use and other estimations relating to other approximations are not set (step 5012). If enhancement is desired, step 5018 is followed. A uniform string length distribution is defined (step 5018) and a decision is made as to whether further enhancement is desired (step 5020). If not, label output probability values and string length probability values are approximated and set for use in the acoustic matching. If further enhancement is desired, acoustic matching is limited to the first J labels in the generated string (step 5022). Whether or not one of the enhanced embodiments is selected, the parameter values determined are set in step 5012, whereupon each phone machine in each word baseform has been trained with the desired approximations that enable the fast approximate matching.

K. Constructing Phonetic Baseforms

One type of Markov model phone machine which can be used in forming baseforms is based on phonetics. That is, each phone machine corresponds to a given phonetic sound, such as a phonetic element selected from the International Phonetic Alphabet.

For a given word, there is a sequence of phonetic sounds each having a respective phone machine corresponding thereto. Each phone machine includes a number of states and transitions therebetween, some of which can produce a feneme output and some (referred to as null transitions) which cannot. Statistics relating to each phone machine—as noted hereinabove—include (a) the probability of a given transition occurring and (b) the likelihood of a particular feneme being produced at a given transition. Preferably, at each non-null transition there is some probability associated with each feneme. In a feneme alphabet shown in Table 1, there are 200 fenemes.

A phone machine used in forming phonetic baseforms is illustrated in FIG. 3. A sequence of such phone machines is provided to represent each word as a baseform.

A sample of statistics for one phone identified as phone DH are set forth in Table 2. As an approximation, the label output probability distribution for transitions tr1, tr2, and tr8 of the phone machine of FIG. 3 are represented by a single distribution; transitions tr3, tr4, tr5, and tr9 are represented by a single distribution; and transitions tr6, tr7, and tr10 are represented by a single distribution. This is shown in Table 2 by the assignment of arcs (i.e. transitions) to the respective columns 4, 5, or 6. Table 2 shows the probability of each transition and the probability of a label (i.e. feneme) being generated in the beginning, middle, or end, respectively, of the phone DH. For the DH phone, for example, the probability of the transition from state $S_1$ to state $S_2$ is counted as 0.07243. The probability of transition from state $S_1$ to state $S_4$ is 0.92757. (In that these are the only two possible transitions from the initial state, their sum equals unity.) As to label output probabilities, the DH phone has a 0.091 probability of producing the feneme AE13 (see Table 1) at the end portion of the phone, i.e. column 6 of Table 2. Also in Table 2 there is a count associated with each node (or state). The node count is indicative of the number of times during the training that the phone was in the corresponding state. Statistics as in Table 2 are found for each phoneme machine.

The arranging of phonetic phone machines into a phonetic word baseform sequence is typically performed by a phonetician and is normally not done automatically.

The phonetic baseform has been used in the detailed match and in the fast approximate acoustic match.

Other types of baseform may be employed in accordance with the invention, the phonetic baseform being discussed herein for purposes of explanation.

(II) Stack Decoding Apparatus and Method

A. Definitions

Figure 20:
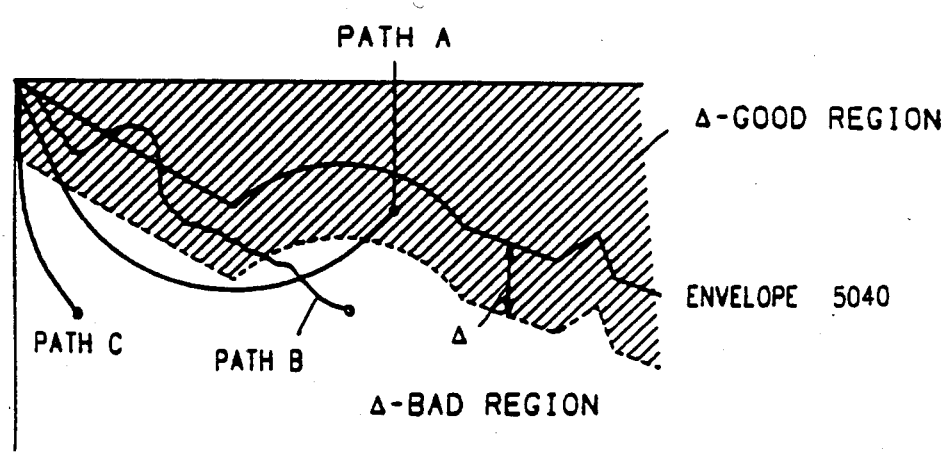
FIG. 20 is a graph depicting likelihood vectors for respective word paths and a likelihood envelope.

To facilitate the description of the present invention, the following terms are defined with reference to FIG. 4 and FIG. 20. In FIG. 4 and FIG. 20, a plurality of successive labels $y_1 y_2$—are shown generated at successive "label intervals" (or "label positions").

Also shown in FIG. 20 are a plurality of word paths, namely path A, path B, and path C. In the context of FIG. 4, path A could correspond to the entry "to be or", path B to the entry "two b", and path C to the entry "too". For a subject word path, there is a label (or equivalently a label interval) at which the subject word path has the highest probability of having ended—such label being referred to as a "boundary label".

For a word path W representing a sequence of words, the label string may be divided with partitions where each words ends and the succeeding word begins. For example, the first word $w_1$ of word path W may be viewed as extending from labels $y_1$ through $y_{t1}$; the second word $w_2$ extending from $y_{t1+1}$ through $y_{t2}$; the third word $w_3$ extending from $y_{t2+1}$ through $y_{t3}$; . . . ; and the last word $w_k$ extending from $y_{t(k-1)+1}$ through $y_{tk}$.

For any given word path, there is a "likelihood value" associated with each label or label interval, including the first label of the label string through to the boundary label. Taken together, all of the likelihood values for a given word path represent a "likelihood vector" for the given word path. Accordingly, for each word path there is a corresponding likelihood vector. Likelihood values $L_t$ are illustrated in FIG. 20.

A "likelihood envelope" $\lambda_t$ at a label interval t for a collection of word paths $W^1, W^2, \ldots, W^s$ is defined mathematically as:

$$\lambda_t = \max(L_t(W^1), \ldots, L_t(W^s))$$

That is, for each label interval, the likelihood envelope includes the highest likelihood value associated with any word path in the collection. A likelihood envelope 5040 is illustrated in FIG. 20.

A word path is considered "complete" if it corresponds to a complete sentence. A complete path is preferably identified by a speaker entering an input, e.g. pressing a button, when he reaches the end of a sentence. The entered input is synchronized with a label interval to mark a sentence end. A complete word path cannot be extended by appending any words thereto. A "partial" word path corresponds to an incomplete sentence and can be extended.

Partial paths are classified as "live" or "dead". A word path is "dead" if it has already been extended and "live" if it has not. With this classification, a path which has already been extended to form one or more longer extended word paths is not reconsidered for extension at a subsequent time.

Each word path is also characterizable as "good" or "bad" relative to the likelihood envelope. The word path is good if, at the label corresponding to the boundary label thereof, the word path has a likelihood value which is within $\Delta$ of the maximum likelihood envelope. Otherwise the word path is marked as "bad". Preferably, but not necessarily, $\Delta$ is a fixed value by which each value of the maximum likelihood envelope is reduced to serve as a good/bad threshold level.

For each label interval there is a stack element. Each live word path is assigned to the stack element corresponding to the label interval that corresponds to the boundary label of such a live path. A stack element may have zero, one, or more word path entries—the entries being listed in order of likelihood value.

Figure 1:
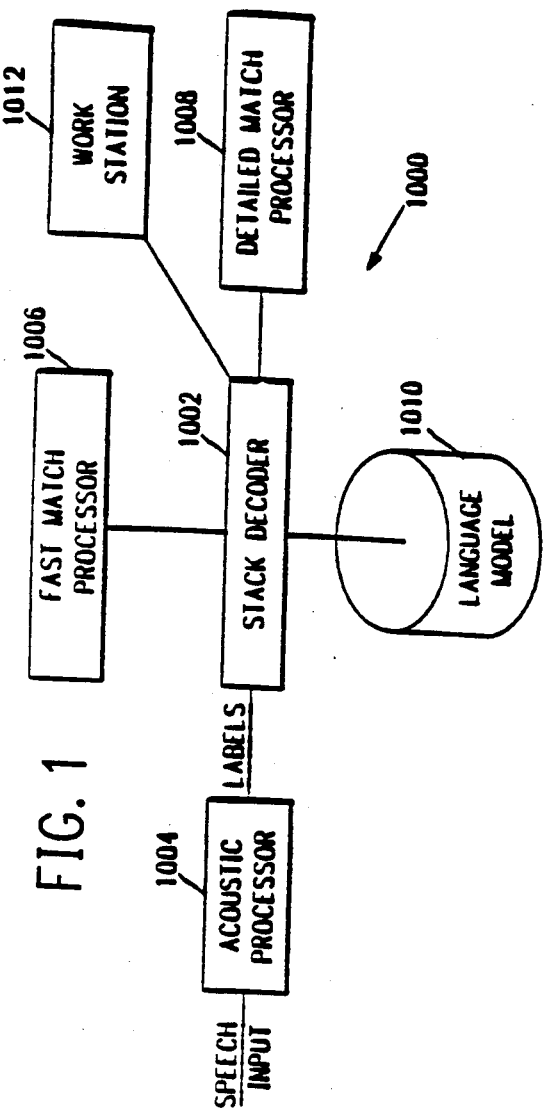
FIG. 1 is a general block diagram of a system environment in which the present invention may be practiced.

The steps performed by the stack decoder 1002 of FIG. 1 are now discussed.

B. Selecting Likely Words

Referring again to FIG. 4, a string of labels $y_1$—generated by the acoustic processor 1004 in response to a speech input is shown. Starting at the beginning of the string a plurality of likely first words ("to", "two", and "too") are selected by applying the fast match, detailed match, and language model as discussed hereinabove.

That is, preferably the fast match eliminates words from the vocabulary to provide a list of candidate words having an acoustic probability satisfying some threshold. The threshold may be a predefined minimum probability or may relate to a maximum number of words permitted on the list, or both. Based on the language model, a contextual probability for each candidate word is derived and applied to each candidate word—the less probable candidates preferably being discarded. Thereafter a detailed match followed by a second application of the language model on those words remaining after the detailed match is preferably performed to determine a list of likely first words. Each of the likely first words represents a respective word path which is examined to determine if it should be next selected for extension.

It should be noted that the "first word" referred to herein is the first word of a sentence and that there are normally prior words in a previous sentence which are considered in applying the language model.

It should be further noted that the word selection process is also applicable to determining the next word in a word path given a series of previous words. Specifically, the last label of the last word (i.e. the boundary label) in the word path is located and the labels thereafter are examined to determine a list of likely follower words. In particular, the labels following the boundary label are subjected to the fast match, language model, detailed match, and language model as described hereinabove. In this instance, the previous words in the word path are used in the language model procedure.

C. Locating The Boundary Label

The stack decoder 1002 recognizes a correlation between each word path (e.g. a likely first word or a word path extended therefrom) and the string of labels generated by the acoustic processor 1004. For a subject word path, there is a substring of labels correlating thereto. Specifically, the substring extends from the first label of the generated string through the boundary label corresponding to the subject word path. Associated with each substring is a likelihood vector. For a particular substring, the likelihood vector has a component for each label interval.

Referring back to the description of the acoustic matching procedures discussed hereinabove, it is recalled that there is an end-time distribution correlating to a word that is matched to a string of labels. The label at which the distribution is greatest may be characterized as a boundary label at which the next word, if any, starts. (In this regard, a filter may be provided which eliminates label intervals which do not correspond to speech input. The string Y thus may represent one word after another with no silence spaces therebetween. Such filters are known in the art and are thus not discussed.)

An alternative method of determining the most likely boundary between two words is set forth in an article entitled "Faster Acoustic Match Computation" (by L. R. Bahl, F. Jelinek, and R. L. Mercer) in the *IBM Technical Disclosure Bulletin* volume 23, number 4, September 1980. Briefly, the article discusses methodology for addressing two similar concerns: (a) how much of a label string Y is accounted for by a word (or word sequence) and (b) at which label interval does a partial sentence—corresponding to a part of the label string—end.

The approach set forth in the *IBM Technical Disclosure Bulletin* article is described as follows. Where the probability $Pr(Y^t|W)$ is the same as a probability $\alpha(s^N, t)$—with $Y^t$ corresponding to the label string from the first label through label t and with $S^N$ being the last state of the Markov model representing the sequence W—a term $\delta(t)$ is defined as:

$$\delta(t) = \Sigma_s \alpha(s,t).$$

$E(Y^t)$ is denoted as the expected value of $\delta(t)$ averaged over all word sequences. It should be noted that the $\alpha$ values are computed successively for increasing values of t. After the $\alpha$ values have been computed for a particular t value, the quantity $\delta(t)/E(y^t)$ is examined. If this value falls below a predefined threshold, further computations of the $\alpha$'s is terminated.

The most likely boundary for W is then the value of t for which $\alpha(s^N,t)/E(Y^t)$ is maximum. $E(Y^t)$, it is noted, is determined from training data by computing and saving the values of $\delta(t)$ during training. Typically, a Markov-type approximation is used according to the expression: $E(Y^t) = \pi_{i=1}^t E(Y_i/Y_{i-k}^{i-1})$. In practice, k=1 is sufficient.

If a likely first word (or word path) is to be extended, the boundary label serves as the point from which acoustic matching proceeds in determining likely follower words.

D. Evaluating a Likelihood at Each Label Interval Along a Word Path

Referring to FIG. 20, a likelihood value $L_t$ is shown at successive label intervals for each given word path. The likelihood values are determined according to the following definition:

For a word k, $L_0 = 0;$ $L_t = \log(Pr(w_1-w_i)) + \log(Pr(y_1-y_t|w_1-w_i))$ for (boundary label for $w_1'w_{(i-1)}) < t \leq$ (boundary label for $w_1-w_i$); and $L_t = -\infty$ for t > the boundary label for the word path W.

The first log probability in the middle expression is recognized as a language model probability of the sequence of words W extending through word $w_i$. The second log probability in the middle expression is recognized as the acoustic match probability.

E. Determining the Word Path to be Extended

Referring to FIG. 20, some word paths—path A, path B, and path C—are illustrated together with the maximum likelihood envelope 8040. The graph of each word path is determined by the respective likelihood values thereof.

Forming the likelihood envelope and determining which word paths are "good" are interrelated as suggested by the flowchart of FIG. 21. In a sample flowchart set forth in FIG. 21, a null path is first entered into the first stack(O) in step 5050. A stack(complete) element is provided which contains complete paths, if any, which have been previously determined (step 5052). Each complete path in the stack(complete) element has a likelihood vector associated therewith. The likelihood vector of the complete path having the highest likelihood at the boundary label thereof initially defines the maximum likelihood envelope. If there is no complete path in the stack(complete) element, the maximum likelihood envelope is initialized as $-\infty$ at each label interval. Alternatively, if complete paths are not specified, the maximum likelihood envelope may always been initialized at $-\infty$. Initializing the envelope is depicted by steps 5054 and 5056.

After the maximum likelihood envelope is initialized, it is reduced by a predefined amount $\Delta$ to form a $\Delta$-good region above the reduced likelihood and a $\Delta$-bad region below the reduced likelihoods. The value of $\Delta$ controls the breadth of the search. The larger $\Delta$ is, the larger the number of word paths that are considered for possible extension. When $\log_{10}$ is used for determining $L_t$, a value of 2.0 for $\Delta$ provides satisfactory results. The value of $\Delta$ is preferably, but not necessarily, uniform along the length of label intervals.

If a word path has a likelihood at the boundary label thereof which is in the $\Delta$-good region, the word path is marked "good". Otherwise, the word path is marked "bad".

As shown in FIG. 21, a loop for up-dating the likelihood envelope and for marking word paths as "good" (for possible extension) or "bad" starts with the finding of the longest unmarked word path (step 5058). If more than one unmarked word path is in the stack corresponding to the longest word path length, the word path having the highest likelihood at the boundary label thereof is selected. If a word path is found, it is marked as "good" if the likelihood at the boundary label thereof lies within the Δ-good region or "bad" otherwise (step 5060). If the word path is marked "bad", another unmarked live path is found and marked (step 5062). If the word path is marked "good", the likelihood envelope is up-dated in include the likelihood values of the path marked "good". That is, for each label interval, an updated likelihood value is determined as the greater likelihood value between (a) the present likelihood value in the likelihood envelope (b) the likelihood value associated with word path marked "good". This is illustrated by steps 5064 and 5066. After the envelope is up-dated, a longest best unmarked live word path is again found (step 5058).

The loop is then repeated until no unmarked word paths remain. At that time, the shortest word path marked "good" is selected. If there is more than one word "good" path having a shortest length, the one having the highest likelihood at the boundary label thereof is selected (step 5070). The selected shortest path is then subjected to extension. That is, at least one likely follower word is determined as indicated above by preferably performing the fast match, language model, detailed match, and language model procedure. For each likely follower word, an extended word path is formed. Specifically, an extended word path is formed by appending a likely follower word on the end of the selected shortest word path.

After the selected shortest word path is formed into extended word paths, the selected word path is removed from the stack in which it was an entry and each extended word path is entered into the appropriate stack therefor. In particular, an extended word path becomes an entry into the stack corresponding to the boundary label of the extended word path step (5072).

Figure 22:
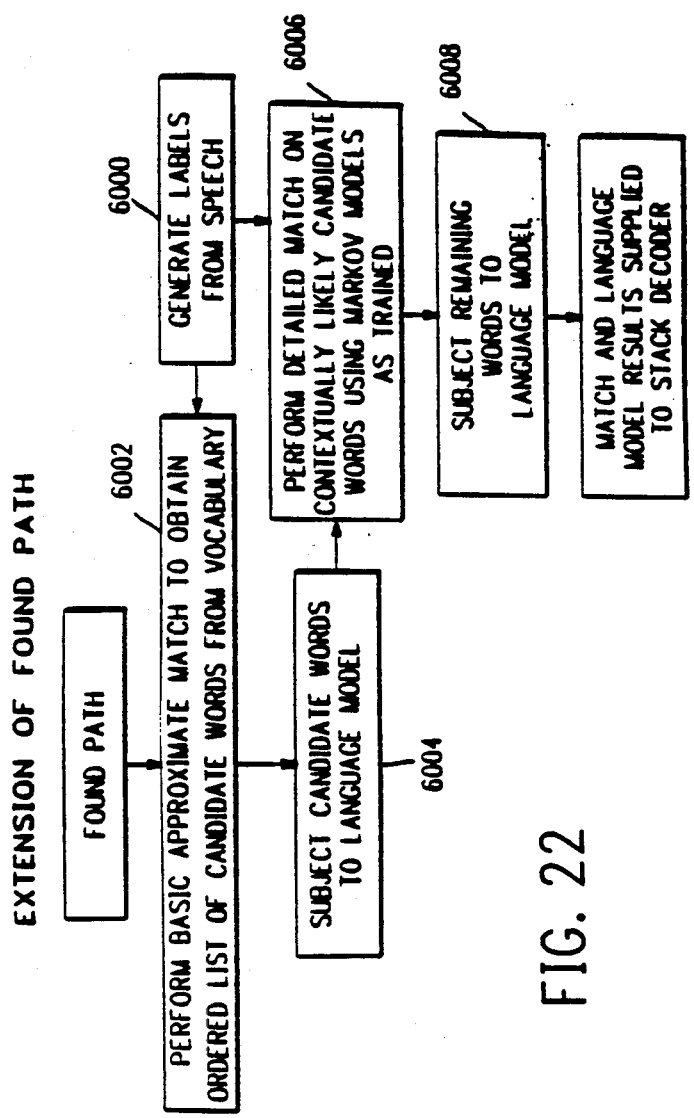
FIG. 22 is a flowchart representing steps performed in extending a selected word path.

With regard to step 5072, the action of extending the chosen path is discussed with reference to the flowchart of FIG. 22. After the path is found in step 5070, the following procedure is performed whereby a word path or paths are extended based on an appropriate approximate match.

At step 6000, the acoustic processor 1002 (of FIG. 1) generates a string of labels as described hereinabove. The string of labels is provided as input to enable step 6002 to be performed. In step 6002 the basic or one of the enhanced approximate matching procedures is performed to obtain an ordered list of candidate words according to the teachings outlined hereinabove. Thereafter, a language model (as described hereinabove) is applied in step 6004 as described hereinabove. The subject words remaining after the language model is applied are entered together with the generated labels in a detailed match processor which performs step 6006. The detailed match results in a list of remaining candidate words which are preferably subjected to the language model in step 6008. The likely words—as determined by the approximate match, detailed match, and language model are used for extension of the path found in step 5070 of FIG. 21. Each of the likely words determined at step 6008 (FIG. 22) are separately appended to the found word path so that a plurality of extended word paths may be formed.

After the extended paths are formed and the stacks are re-formed, the process repeats by returning to step 5052.

Each iteration thus consists of selecting the shortest best "good" word path and extending it. A word path marked "bad" on one iteration may become "good" on a later iteration. The characterization of a live word path as "good" or "bad" is thus made independently on each iteration. In practice, the likelihood envelope does not change greatly from one iteration to the next and the computation to decide whether a word path is "good" or "bad" is done efficiently. Moreover, normalization is not required.

When complete sentences are identified, step 5074 is preferably included. That is, when no live word paths remain unmarked and there are no "good" word paths to be extended, decoding is finished. The complete word path having the highest likelihood at the respective boundary label thereof is identified as the most likely word sequence for the input label string.

In the case of continuous speech where sentence endings are not identified, path extension proceeds continually or for a predetermined number of words as preferred by the system user.

G. Stack Decoder Embodiment

Appendix 3 is a program listing in the PL/I language which implements the stack decoding set forth above.

Figure 23:
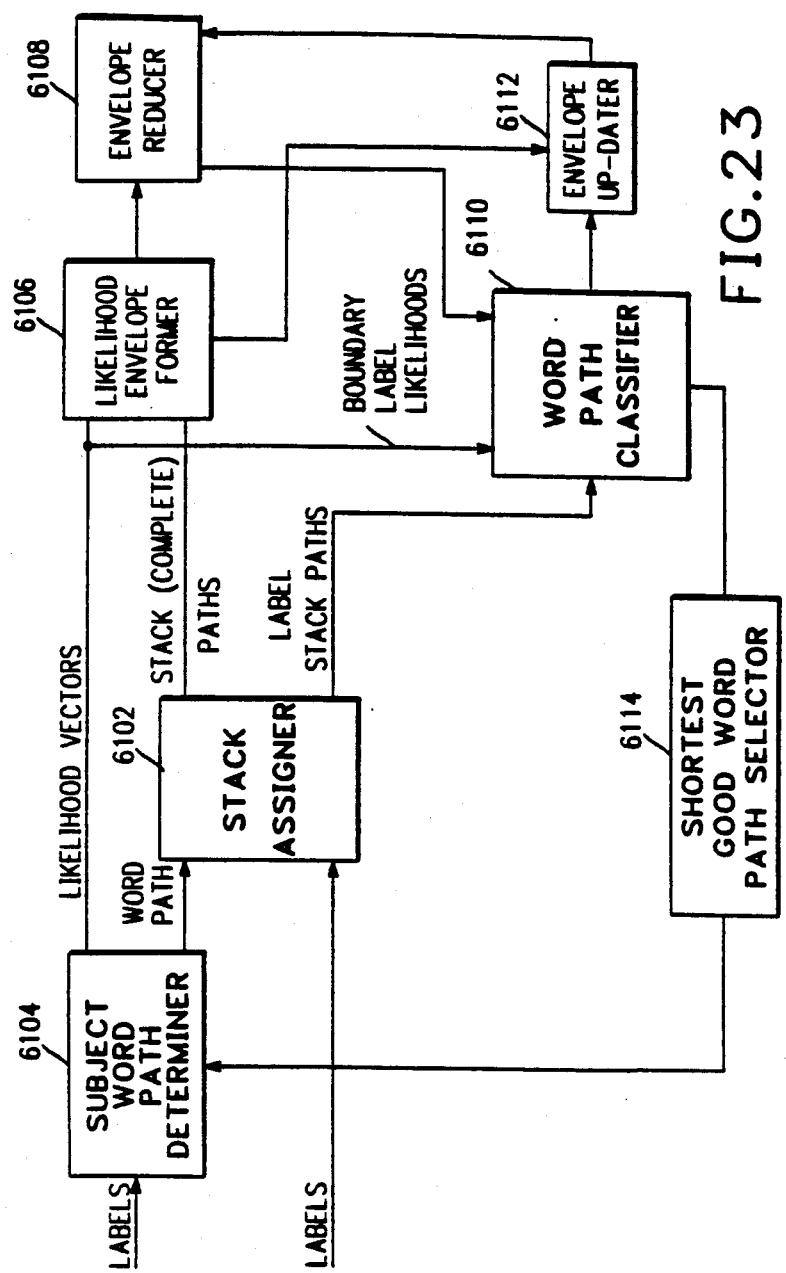
FIG. 23 is an embodiment of a stack decoder according to the present invention.

When run on an IBM 4341, the stack decoder 1002 as shown in FIG. 23 includes: (a) means for assigning to each label interval a label stack (6102); (b) means for determining for a subject word path (i) a boundary label interval at which the subject word path most likely ends and (ii) a likelihood at each label interval prior to and including the boundary label interval thereof (6104); (c) means for assigning the subject word path to the label stack corresponding to the boundary label thereof as an entry therein (6102); (d) said determining means and assigning means acting on each word path; (e) means for maintaining a complete-path stack which contains the most likely word path, if any, corresponding to a sentence (6102); (f) means for forming a likelihood envelope as (i) the respective likelihoods for the word path contained in the complete-path stack or (ii), if there is no word path contained in the complete-path stack, a minimum reference likelihood at each label interval (6106); (g) means for reducing the likelihoods in the likelihood envelope (6108); (h) means for examining the word path entries in all label stacks longest first and, where a label stack has more than one entry, for examining the word paths based on decreasing likelihood wherein said examining means includes: (i) means for classifying a word path as good if the likelihood at the label corresponding to the boundary label for a subject word path exceeds the reduced likelihood at the label corresponding to the boundary label, (ii) said classifying means acting on each word path as the subject word path (6110); (j) means for up-dating, after classifying a word path as good, the likelihood value for each label in the envelope as either (i) the current likelihood value in the envelope or (ii) the likelihood value in the classified good word path, whichever is greater (6112); and (k) means for selecting, after all word paths have been classified, the shortest good word path as the word path to be extended or, if there is more than one good word path having the shortest length, selecting the shortest word path having the highest likelihood value at the boundary label thereof (6114). The word path determiner 6104 generates a list of most likely follower words based on the fast match, language model, and detailed match and forms at least one extended word path by appending one of the likely follower words onto the selected shortest good word path. The word path determiner 6104 replaces extended (dead) word paths with the extended word paths derived therefrom, the extended word paths being assigned to an appropriate stack by the stack assigner 6102 based on the label interval of the boundary label thereof.

H. Alternative Embodiments

In order to further reduce computational requirements and/or to improve accuracy, the following modifications are contemplated.

First, a limit may be imposed on the number of paths that are extended from a particular stack. For example, no more than the ten most likely word paths may be considered for extension from a particular stack.

Second, a limit may be imposed which sets a minimum word path length which is extendible based on the length of a word path already extended. For example, if a word path from stack(t) has been extended, no word paths in stack(t−a), stack(t−a−1),—, stack(O) will be considered for extension where "a" is a selectable value.

Third, with regard to the path selection process, more than one good path may be selected for extension before the envelope is recomputed.

In continuous speech, it is sometimes difficult to obtain an accurate estimate of the boundary label for a given word path. Many different end times may appear to be a reasonable boundary label. An entry may be inserted into each stack that corresponds to a reasonable boundary label.

While the invention has been described with reference to a preferred embodiment thereof, it will be understood by those skilled in the art that various changes in form and details may be made without departing from the scope of the invention.

TABLE 1

THE TWO LETTERS ROUGHLY REPRESENT THE SOUND OF THE ELEMENT.

TWO DIGITS ARE ASSOCIATED WITH VOWELS:

FIRST:   STRESS OF SOUND

SECOND:  CURRENT IDENTIFICATION NUMBER

ONE DIGIT ONLY IS ASSOCIATED WITH CONSONANTS:

SINGLE DIGIT:  CURRENT IDENTIFICATION NUMBER

```
001 AA11    029 BX2-    057 EH02    148 TX5-    176 XX11
002 AA12    030 BX3-    058 EH11    149 TX6-    177 XX12
003 AA13    031 BX4-    059 EH12    150 UH01    178 XX13
004 AA14    032 BX5-    060 EH13    151 UH02    179 XX14
005 AA15    033 BX6-    061 EH14    152 UH11    180 XX15
006 AE11    034 BX7-    062 EH15    153 UH12    181 XX16
007 AE12    035 BX8-    126 RX1-    154 UH13    182 XX17
008 AE13    036 BX9-    127 SH1-    155 UH14    183 XX18
009 AE14    037 DH1-    128 SH2-    156 UU11    184 XX19
010 AE15    038 DH2-    129 SX1-    157 UU12    185 XX2-
011 AW11    039 DQ1-    130 SX2-    158 UXG1    186 XX20
012 AW12    040 DQ2-    131 SX3-    159 UXG2    187 XX21
013 AW13    041 DQ3-    132 SX4-    160 UX11    188 XX22
014 AX11    042 DQ4-    133 SX5-    161 UX12    189 XX23
015 AX12    043 DX1-    134 SX6-    162 UX13    190 XX24
016 AX13    044 DX2-    135 SX7-    163 VX1-    191 XX3-
017 AX14    045 EE01    136 TH1-    164 VX2-    192 XX4-
018 AX15    046 EE02    137 TH2-    165 VX3-    193 XX5-
019 AX16    047 EE11    138 TH3-    166 VX4-    194 XX6-
020 AX17    048 EE12    139 TH4-    167 WX1-    195 XX7-
021 BQ1-    049 EE13    140 TH5-    168 WX2-    196 XX8-
022 BQ2-    050 EE14    141 TQ1-    169 WX3-    197 XX9-
023 BQ3-    051 EE15    142 TQ2-    170 WX4-    198 ZX1-
024 BQ4-    052 EE16    143 TX3-    171 WX5-    199 ZX2-
025 BX1-    053 EE17    144 TX1-    172 WX6-    200 ZX3-
026 BX10    054 EE18    145 TX2-    173 WX7-
027 BX11    055 EE19    146 TX3-    174 XX1-
028 BX12    056 EH01    147 TX4-    175 XX10
```

TABLE 2

| PHONE | 3 | DH | 7 NODES. | 13 ARCS. | 3 ARC LABELS. | | |
|---|---|---|---|---|---|---|---|
| NODE  | 1     | 2    | 3    | 4     | 5     | 6     | 7   |
| LABEL | 8     | 9    | 10   | 11    | 12    | 13    | 0   |
| COUNT | 31.0  | 1.7  | 1.7  | 119.1 | 115.4 | 120.1 | 0.0 |

| ARC   | 1 -> 2  | 1 -> 4  | 1 -> 7  | 2 -> 3  | 2 -> 7  | 3 -> 7  | 3 -> 7  |
|---|---|---|---|---|---|---|---|
| LABEL | 4       | 4       | NULL    | 5       | NULL    | 6       | NULL    |
| PROB  | 0.07243 | 0.92757 | 0.00000 | 0.99259 | 0.00741 | 0.93982 | 0.06018 |

| ARC   | 4 -> 4  | 4 -> 5  | 5 -> 5  | 5 -> 6  | 6 -> 6  | 6 -> 7  |
|---|---|---|---|---|---|---|
| LABEL | 4       | 5       | 5       | 5       | 6       | 6       |
| PROB  | 0.75179 | 0.24821 | 0.74389 | 0.25611 | 0.75370 | 0.24630 |

| LABEL | 4     | 5     | 6     |
|---|---|---|---|
| COUNT | 120.8 | 146.4 | 121.6 |
| AE13  |       | 0.091 |       |
| BX10  | 0.030 |       |       |
| BX3   | 0.130 |       |       |
| BX8   | 0.011 | 0.086 |       |
| DH1   | 0.020 | 0.040 | 0.013 |
| DQ2   | 0.011 | 0.052 |       |
| EH0T  | 0.010 | 0.014 | 0.167 |
| EH02  |       |       | 0.026 |
| EH11  |       |       | 0.015 |
| EH13  |       |       | 0.012 |
| EH14  |       |       | 0.062 |
| ER14  |       |       | 0.024 |
| FX2   |       | 0.045 |       |
| FX3   |       | 0.148 |       |
| GX2   |       | 0.013 |       |
| GX5   | 0.148 |       |       |
| GX6   | 0.246 | 0.023 |       |
| HX1   |       | 0.011 |       |
| IX04  | 0.011 |       | 0.020 |
| IX13  | 0.025 |       | 0.026 |
| KQ1   |       | 0.014 | 0.024 |
| KX2   |       | 0.013 |       |
| MX2   | 0.029 | 0.043 | 0.012 |
| NX3   | 0.019 |       |       |
| NX5   | 0.049 |       |       |
| NX6   |       | 0.017 | 0.012 |
| OU14  |       |       | 0.023 |
| PQ1   | 0.029 | 0.018 |       |
| TH2   |       | 0.020 |       |
| TQ3   |       | 0.017 |       |
| UH0T  |       |       | 0.020 |
| UH02  | 0.025 | 0.082 | 0.109 |
| UXG2  |       |       | 0.016 |
| UX12  |       |       | 0.062 |
| UX13  |       |       | 0.183 |
| VX1   |       |       | 0.016 |
| VX3   | 0.041 | 0.283 | 0.016 |
| WX2   | 0.023 | 0.014 |       |
| XX23  | 0.072 |       |       |
| OTHER | 0.073 | 0.047 | 0.048 |

APPENDIX 1

```
"""""""""""""""""""""""""""""""""""""""""""""""""""""""""""""""""""""""""""""""
"                                                                             "
"   Subroutine EXTCOL.                                                        "
"                                                                             "
"   Extends the column                                                        "
"                                                                             "
"   Register Usage:                                                           "
"                                                                             "
"     SP:  , 1, 2, 3, 4, 5, 6, 7, 8, 9, 10, 11, 12, 13, 14, 15                "
"                                                                             "
"     DPX: -4, -3, -2, -1, 0           (DPA = 0)                              "
"     DPY: -4, -3, -2, -1, 0, 1, 2, 3  (DPA = 0)                              "
"                                                                             "
"""""""""""""""""""""""""""""""""""""""""""""""""""""""""""""""""""""""""""""""

"""""""""""""""""""""""""""""""""""""""""""""""""""""""""""""""""""""""""""""""
"   Restore the registers from main memory.                                   "
"""""""""""""""""""""""""""""""""""""""""""""""""""""""""""""""""""""""""""""""

EXTCOL:    LDMA; DB = SFENPTR; WRTLMN      "get feneme list pointer
           LDMA; DB = STLPPTR; WRTLMN      "get tail prob list pointer
           LDMA; DB = SSTROFF; WRTLMN      "get start offset LDSPI FENPTR; DB < MD           "save feneme list pointer
           LDSPI TLPPTR; DB < MD           "save tail prob list pointer
           LDSPI STROFF; DB < MD           "save start offset LDMA; DB = SSTRROW; WRTLMN      "get start row
           LDMA; DB = SOUTOFF; WRTLMN      "get output offset
           LDMA; DB = SINBNDY; WRTLMN      "get input boundary pointer LDSPI STRROW; DB < MD           "save start row
           LDSPI OUTOFF; DB < MD           "save output offset
           LDSPI INBNDY; DB < MD           "save input boundary pointer LDMA; DB = STIME;   WRTLMN      "get the current time
           LDMA; DB = SSTRLEN; WRTLMN      "get start distribution length
           LDMA; DB = ALEXLEX; WRTLMN      "get lexeme length LDSPI TIME;   DB < MD           "save current time
           LDSPI STRLEN; DB < MD           "save start distribution length
           LDSPI LOOPCNT; DB < MD          "save lexeme length SUB   STRROW, LOOPCNT           "loop count = lexlen - strrow LDSPI PRMADR; DB = SFENPTR      "put back feneme pointer + 1
           INC   FENPTR; DPX(-3) < SPFN
           MOV   PRMADR, PRMADR; SETMA; MI < DPX(-3)

LDSPI PRMADR; DB = STLPPTR      "put back tail pointer + 1
           INC   TLPPTR; DPX(-3) < SPFN
           MOV   PRMADR, PRMADR; SETMA; MI < DPX(-3)

LDSPI PRMADR; DB = SINBNDY      "put back inbndy + 1
           INC   INBNDY; DPX(-3) < SPFN
```

```
        MOV    PRMADR, PRMADR; SETMA; MI < DPX(-3)

LDSPI  PRMADR; DB = STIME        "put back time + 1
        INC    TIME;   DPX(-3) < SPFN
        MOV    PRMADR, PRMADR; SETMA; MI < DPX(-3)
```

"""""""""""""""""""""""""""""""""""""""""""""""""""""""""""""""""""""""""""""""
" Get the next feneme and tail probability.                                   "
"""""""""""""""""""""""""""""""""""""""""""""""""""""""""""""""""""""""""""""""

```
        OUT;   DB = PAGE0               "flip to page zero
        MOV    FENPTR, FENPTR; SETMA    "get next feneme
        MOV    TLPPTR, TLPPTR; SETMA    "get next tail probability
        OUT;   DB = PAGE1               "flip back to page one
        LDSPI  FENEME; DB < MD          "save the feneme
        DPY(TPY) < MD                   "save the tail probability
        MOV    FENEME, FENEME; DPX(CFENX) < SPFN LDSPI  FENLOK; DB = AFENLOK     "get base addr of feneme lookup
        ADD    FENEME, FENLOK; SETMA    "use feneme to get fenbas
        LDSPI  INCOL;  DB = ACOLUMN     "get base addr for input col
        LDSPI  OUTCOL; DB = ACOLUMN     "get base addr for output col
        LDSPI  FENBAS; DB < MD          "pointer into feneme probs ADD    STROFF, INCOL            "incol = start_offset + ...
        ADD    STRROW, INCOL            "        start_row
        ADD    OUTOFF, OUTCOL           "outcol = output_offset + ...
        ADD    STRROW, OUTCOL           "        start_row - 2;

LDSPI  TRMLOK; DB = ATRMLOK     "get base addr of tram lookup
        ADD    STRROW, TRMLOK; SETMA    "lookup the tram base ptr
        DEC    OUTCOL                   "outcol... - 1
        DEC    OUTCOL                   "outcol... - 2
        LDSPI  TRMPTR; DB < MD          "get starting tram addr
        LDSPI  PRMADR; DB = !FFTSZ      "compensate for tram base
        ADD    PRMADR, PRMADR           "which is at 2 x !FFTSZ
        ADD    PRMADR, TRMPTR
```

"""""""""""""""""""""""""""""""""""""""""""""""""""""""""""""""""""""""""""""""
" Start the pipeline going...                                                 "
"""""""""""""""""""""""""""""""""""""""""""""""""""""""""""""""""""""""""""""""

```
        MOV    INCOL, INCOL; SETMA      "get col(start_ptr)
        MOV    INBNDY, INBNDY; SETMA    "get inbndy(time) in case
        SUB#   TIME, STRLEN             "start_length - time
        BLT    OUTSIDE;                 "if <= we are outside inbndy
               DPY(LIY) < MD            "and save col(start_ptr)

INSIDE: FADD   DPY(LIY), MD             "col() + inbndy(time)
        FADD                            "push the adder
        DPY(LIY) <FA                    "last_input = col + inbndy OUTSIDE: DPY(PROFY) < ZERO              "zero out the running profile
```

```
"   Start the pipeline going... start first loop                                    "

MOV TRMPTR, TRMPTR; SETTMA        "start transfer of phone num

NOP                               "wait for table memory

LDSPI PHONE; DB < TM;             "save the phone number
              INCTMA                          "increment tramptr ADD FENBAS, PHONE; SETMA          "lookup feneme prob FADD DPY(LIY), ZERO;              "push last_state thru adder
              INCTMA                          "start transfer of null trans FADD;                             "push the adder
              INCTMA;                         "start transfer of phone num
              DPY(SOFAY) < ZERO               "clear 2nd oldest farc "   Start the pipeline going... do first loop                                       "

FMUL  TM, FA;                     "null trans * last_input
              INC INCOL; SETMA;               "start transfer of col()
              DPY (LIY) < FA;                 "save last input
              FADD DPY(PROFY), FA;            "profile = prof + last_input
              DPX (FENX) < MD FMUL DPX(FENX), DPY(TPY);         "feneme prob * tail prob
              LDSPI PHONE; DB < TM;           "save the phone number
              INCTMA;                         "start trans of self trans
              FADD                            "push the adder FMUL;
              DPY(PROFY) < FA;                "save the running profile
              ADD FENBAS, PHONE; SETMA;       "lookup feneme prob
              DPX(FAX) < ZERO;                "zero out forward arc
              FADD                            "null add FADD FM, MD;                      "col() + null*last_input
              FMUL TM, DPX(FAX);              "self trans * forward arc
              INCTMA;                         "start transfer of null trans
              DPX(OFAX) < DPY(SOFAY)          "push queue of forward arcs FADD;
              FMUL FM, DPY(LIY);              "last_input * feneme_prob
              INCTMA;                         "start transfer of phone num
              DPY(SOFAY) < DPX(FAX)           "zero out 2nd oldest farc
```

```
"  Loop for index = 1 to loopcnt (= lexeme_length - start_row)    "

EXTLOOP:   FMUL  TM, FA;                        "null trans * last_input
           INC INCOL; SETMA;                    "start transfer of col()
           DPY (LIY) < FA;                      "save last input
           FADD DPY(PROFY), FA;                 "profile = prof + last_input
           DPX (FENX) < MD FMUL DPX(FENX), DPY(TPY);            "feneme prob * tail prob
              DPY(SELFY) < FM;                  "save self arc
              LDSPI PHONE; DB < TM;             "save the phone number
              INCTMA;                           "start trans of self trans
              FADD                              "push the adder FMUL;
                 DPY(PROFY) < FA;               "save the running profile
                 ADD FENBAS, PHONE; SETMA;      "lookup feneme prob
                 DPX(FAX) < FM;                 "save forward arc
                 FADD DPY(SELFY), DPX(OFAX)     "self + oldest_farc FADD  FM, MD;                     "col() + null*last_input
                 FMUL TM, DPX(FAX);             "self trans * forward arc
                 INCTMA;                        "start transfer of null trans
                 DEC LOOPCNT;                   "decrement the loop count
                 DPX(OFAX) < DPY(SOFAY)         "push queue of forward arcs FADD;
                 FMUL FM, DPY(LIY);             "last_input * feneme_prob
                 INCTMA;                        "start transfer of phone num
                 INC OUTCOL; SETMA;             "put out next_output
                 MI < FA;
                 DPY(SOFAY) < DPX(FAX);         "push forward arc queue
                 BGT EXTLOOP                    "keep looping until done(BNE)

"  Trail out of loop...                                                    "

FMUL TM, FA;                      "calculate last forward arc
                 DPY (LIY) < FA;                "save last input
                 FADD DPY(PROFY), FA            "profile = prof + last_input FMUL;                             "push the multiplier
                 DPY(SELFY) < FM;               "save self arc
                 INCTMA;                        "start trans of self trans
                 FADD                           "push the adder FMUL;
                 DPY(PROFY) < FA;               "save the running profile
                 DPX(FAX) < FM;                 "save forward arc
                 FADD DPY(SELFY), DPX(OFAX)     "self + oldest_farc FADD;                             "push the adder
                 FMUL TM, DPX(FAX);             "self trans * forward arc
                 DPX(OFAX) < DPY(SOFAY)         "push queue of forward arcs
```

```
        FMUL;                              "push the multiplier
           INC OUTCOL; SETMA;               "put out next_output
        MI < FA;
        DPY(SOFAY) < DPX(FAX)              "push forward arc queue
```

" Push last outputs out of loop...

```
        FMUL                               "push the multiplier

FADD FM, DPX(OFAX)                 "self + oldest_farc

FADD;                              "push the adder
           DPX(OFAX) < DPY(SOFAY)          "push queue of forward arcs INC OUTCOL; SETMA;                 "put out next_output MI < FA;
        DPY(SOFAY) <. DPX(FAX)             "push forward arc queue INC OUTCOL; SETMA;
           MI < DPX(OFAX)                  "push out oldest forward arc RETURN                             "finished EXTCOL
```

APPENDIX 2

"
" SUBROUTINE APFM
"
" This program implements the acoustic Fast Match in the FPS Array
" Processor. This is the modified Fast Match that runs without
" explicit length distributions.
"

"
" SUBROUTINE EVALPP
"
" This routine performs the actual fast match calculation for the
" current lattice node. The main program only calls this routine to
" evaluate valid nodes - not the null nodes that correspond to leaves.
"

"
" Initializations... given the current lattice node number, look up
" the corresponding clink number, set up match parameters such as
" the length of the start time distribution, pointers to the start
" time distribution in the boundary stacks, and the offset into the
" feneme stream.
"

```
"                                                                        "
"  Initial_zeroes = 4:                                                   "
"                                                                        "
"  Pad the start time distribution with 4 zeroes, increase SDLEN by 4    "
"  to simplify looping after start time distribution ends.               "
"                                                                        "
"  Initialize output_distribution (time - 1), output_sum, set feneme     "
"  prob for first time slice equal to zero by clearing the multiplier.   "
"                                                                        "
"  output_distribution (0) = 0.0;                                        "
"  output_sum              = 0.0;                                        "
"  feneme_prob             = 0.0;                                        "
"  state_1                 = 0.0;                                        "
"  state_2                 = 0.0;                                        "
"  state_3                 = 0.0;                                        "
"  state_4                 = 0.0;                                        "
"                                                                        "

ZERO4:     ADD# SDARY, SDLEN;              "point to last sample in the
             SETMA;                        "start time distribution
             DPX(LASTX) < ZERO;            "zero the last output sample
             DPY(OSY)   < ZERO             "zero the output sum INCMA;                          "last sample + 1
             MI < ZERO;                    "pad out with zero
             DPY(ST1Y) < ZERO;             "state_1 = 0.0
             INC SDLEN                     "sdlen = sdlen + 1

INCMA;                          "last sample + 2
             MI < ZERO;                    "pad out with zero
             DPY(ST2Y) < ZERO;             "state_2 = 0.0
             INC SDLEN                     "sdlen = sdlen + 2

INCMA;                          "last sample + 3
             MI < ZERO;                    "pad out with zero
             DPY(ST3Y) < ZERO;             "state_3 = 0.0
             INC SDLEN                     "sdlen = sdlen + 3

INCMA;                          "last sample + 4
             MI < ZERO;                    "pad out with zero
             DPY(ST4Y) < ZERO;             "state_4 = 0.0
             INC SDLEN                     "sdlen = sdlen + 4

CLR TIME;                       "output time counter = 0
             FMUL DPX(LASTX), DPY(OSY)     "clear the multiplier MOV SDLEN, LOPLIM;              "1st loop limit = sdlen
             FMUL                          "push the multiplier
```

```
"                                                                        "
"  First loop: initial_zeroes = 4                                        "
"                                                                        "
"  Calculate output distribution value for current time, update output   "
"  sum, calculate feneme probability for the next time slice.            "
```

```
"
"  do time = 1 to start_time_length + 4;
"     output_distribution (time) =
"         feneme_prob * (output_distribution (time - 1) + state_1);
"     output_sum  = output_sum + output_distribution (time);
"     state_1     = state_2 * feneme_prob;
"     state_2     = state_3 * feneme_prob;
"     state_3     = state_4 * feneme_prob;
"     state_4     = st_array (time);
"     feneme_prob = fd_array (local_buffer(first_feneme + time))
"                 * tail_buffer (first_feneme + time);
"  end;
"
"////////////////////////////////////////////////////////////////////////////
```

```
L41:        INC LFARY;                    "start transfer of next
            SETMA;                        "feneme symbol from stream
            FADD DPX(LASTX), DPY(ST1Y);   "add last output + state_1
            FMUL                          "push the multiplier INC TPARY;                    "start transfer of next
            SETMA;                        "tail probability
            FMUL FM, DPY(ST2Y);           "state_2 * feneme_prob
            FADD;                         "push the adder pipeline
            DPX(FPX) < FM                 "save feneme_prob INC SDARY;                    "transfer next starting pt
            SETMA;
            FMUL DPX(FPX), FA             "(last+st1) * feneme_prob
            LDSPI FDOFF;                  "get the current feneme
            DB = MD;                      "symbol from bus
            FMUL DPX(FPX), DPY(ST3Y)      "state_3 * feneme_prob ADD# FDOFF, FDARY;            "start transfer of next
            SETMA;                        "feneme probability
            DPX(TPX) < MD;                "save next tail probability
            FMUL DPX(FPX), DPY(ST4Y);     "state_4 * feneme_prob
            DPY(ST1Y) < FM                "state_1 = state_2 * fp FMUL;                         "push the multiplier
            DPX(LASTX) < FM;              "save output sample
            DPY(ST4Y) < MD                "store next input sample INC TIME;                     "update the time counter
            FMUL;                         "push the multiplier
            DPY(ST2Y) < FM;               "state_2 = state_3 * fp
            FADD DPX(LASTX), DPY(OSY)     "add output to output_sum DEC LOPLIM;                   "at end of loop?
            FMUL DPX(TPX), MD;            "feneme * tail prob
            DPY(ST3Y) < FM;               "state_3 = state_4 * fp
            FADD                          "push the adder BGT L41;                      "keep looping if not done
            FMUL;                         "push the multiplier
            DPY(OSY) < FA;                "save output_sum
            INCTMA;                       "update pointer to scratch
            DB = DPX(LASTX);              "area for output dist, save
            OUT                           "the output sample
```

```
"
"                                                                            "
" Second loop:                                                               "
"                                                                            "
" Time is now equal to start_time_length + initial_zeroes, so the            "
" start time distribution has ended and all internal states are              "
" equal to zero.  Therefore, this section of code is common to all           "
" cases of initial zeroes.                                                   "
"                                                                            "
" Loop until time_limit (start_time_length + ld_length - 1), or until        "
" the output falls below loop_cutoff.                                        "
"                                                                            "
"                                                                            "
" do time = start_time_length + 1 + initial_zeroes to time_limit             "
"           while (output_distribution (time) >= loop_cutoff);               "
"                                                                            "
"   output_distribution (time) =                                             "
"           feneme_prob * output_distribution (time - 1);                    "
"   output_sum  = output_sum + output_distribution (time);                   "
"   feneme_prob = fd_array (local_buffer(first_feneme + time))               "
"                 * tail_buffer (first_feneme + time);                       "
" end;                                                                       "
"                                                                            "

EVAL2:      MOV LDLEN, LOPLIM              "loop limit = ld_len - 1

SUB INTZERO, LOPLIM            " - initial_zeroes
            DEC LOPLIM
            BGT L42                        "if looplimit > 0, do it
            JMP EVOUT                      "otherwise, jump to exit L42:        INC LFARY;                     "start transfer of next
              SETMA;                       "feneme symbol from stream
              FMUL                         "push the multiplier · INC TPARY;                     "get next tail prob
              SETMA;                       "from buffer
              FMUL FM, DPX(LASTX)          "last = last * feneme_prob FMUL                           "push the multiplier LDSPI FDOFF;                   "get feneme symbol
              DB = MD;                     "from input stream
              FMUL                         "push the multiplier ADD# FDOFF, FDARY;             "use feneme as pointer into
              SETMA;                       "probability array
              DPX(TPX) < MD;               "save the tail probability
              FSUBR FM, DPY(LCY)           "compare output to cutoff FADD FM, DPY(OSY);             "add output into output_sum
              DPX(LASTX)<FM                "save output in register INC TIME;                      "increment time counter
              FADD                         "push the adder
```

```
        DEC LOPLIM;                     "see if we are done yet
            FMUL DPX(TPX), MD;           "feneme * tail probability
            BFGE EVOUT;                  "quit if output < cutoff
            DPY(OSY)<FA                  "save output sum BGT L42;                         "if not done, keep looping
            FMUL;                        "push the multiplier
            INCTMA;                      "update pointer to scratch
            DB = DPX(LASTX);             "area for output dist, save
            OUT                          "the output sample
```

APPENDIX 3

```
*PROCESS MACRO NIS MAR(2,72,0);                                      DCD00010
 (SUBRG,STRG,STRZ):                                                  DCD00020
DCDX:       /* Decide what to extend */                              DCD00030
 PROC( PATHSXT, OLDEST_EXTENDABLE );                                 DCD00040
/*-----------------------------------------------------------------*/ DCD00050
/*    Decide what paths to extend.  Form envelopes, etc.         */ DCD00060
/* Inputs:                                                        */ DCD00070
/*    (none)                                                      */ DCD00080
/* Outputs:                                                       */ DCD00090
/*    Pathsxt           List of paths to extend                   */ DCD00100
/*    Oldest-extendable Time of oldest path that might be extended */ DCD00110
/*    Segnum...         ...                                       */ DCD00120
/*                                                       08/13/82 */ DCD00130
/*-----------------------------------------------------------------*/ DCD00140
/* Fixed bug in dropping paths. Don't drop if thr <= 0.  05/23/83 */ DCD00150
/* Handle gaps between profiles (from skipped silences). 06/29/83 */ DCD00160
/* Check if any envelope points fall in these gaps.      07/14/83 */ DCD00170
/* Removed SEGNUM as never implemented & no longer needed. 08/08/83 */ DCD00180
/* Corrected "gap checking" code.                        09/12/83 */ DCD00190
/* Include "failed" paths when forming the envelope.     01/30/84 */ DCD00190
/* Set new variable PATHSXT.STACK_PTR                    01/31/84 */ DCN00170
/* Include AFM_SCORE when forming the envelope.          04/19/84 */ DCN00170
/* Warn when ENV array fills up.                         04/19/84 */ DCN00170
/* Set PATHSXT.SELS(1) -> last path when none to extend. 04/26/84 */ DCN00170
/* Ignore sels with null prof ptrs .. fake .(trm)'s      06/15/84 */ DCN00170
/*-----------------------------------------------------------------*/ DCD00200
/* ASSUMPTIONS:                                                   */ DCD00210
/*    All paths end with a null pointer when tracing back,        */ DCD00220
/*    (i.e. assume paths have been beheaded cleanly).             */ DCD00230
/*-----------------------------------------------------------------*/ DCD00240
% INCLUDE                                                            DCD00250
    @DCCTC,         /* Compile-time constants */                     DCD00260
    @DCPTHX,        /* Next paths to extend */                       DCD00270
    @DCSEL,         /* Stack Element    */                           DCD00280
    @DCSTK,         /* Stack Links      */                           DCD00290
    @DCDIST,        /* BNDY & PROF declarations */                   DCD00300
    @DCGLOB,        /* @DCGLOB declaration */                        DCD00310
    @DCPARM;        /* @DCPARM declaration */                        DCD00320
                                                                     DCD00330
    DCL                                                              DCD00340
    /* PATHSXT declared in @DCPTHX */                                DCD00350
    OLDEST_EXTENDABLE FIXED BIN(31),                                 DCD00360
                                                                     DCD00370
    (SEL_PTR, STACK_PTR, P, Q) PTR,                                  DCD00380
    (TBACK, PREV_LB, LB, RB_1, T) FIXED BIN(31),                     DCD00390
    VAL FLOAT BIN,                                                   DCD00400
    (NPTS, SELRANK) FIXED BIN(15),                                   DCD00410
```

```
         BNDY_PTR PTR,                                                    DCD00460
         DIFF FLOAT BIN,                                                  DCD00470
         (I,J) FIXED BIN(15),                                             DCD00480
         1 ENV(50),                    /* (20 was not enough!) */         DCD00420
           2 TIME FIXED BIN(31),                                          DCD00430
           2 SP PTR,                                                      DCD00440
           2 VAL FLOAT BIN,                                               DCD00450

(NULL,DIM,ABS,MAX,MIN) BUILTIN;                                  DCD00490
* dcl envp(50) ptr, envc(50) char(1), kgap fixed bin(15) init(0);         DCD02560
                                                                          DCD00510
/* - - - - - - - - - - - - - - - - - - - - - - - - - - - - - - - - */    DCD00520
                                                                          DCD00530
   /* Initiallize to no paths, but set first to longest in stacks */
   /* for safety .. (may be used by DCRUN).                         */
   PATHSXT.NUMPATHS = 0;
   PATHSXT.SELS(1) = @DCGLOB.STACK_TAIL->STACK.SEL_PTR;
   PATHSXT.ATSILENCE = '0'B;
                                                                          DCD01560

/* Compute envelope only at those times at which paths end in the  */  DCD00540
   /* backup range.  (Also use "failed" paths to form the envelope).  */  DCD00550
                                                                          DCD00560
   /* Search backwards for first (latest) path extended. */               DCD00570
   LATEST_XTND:                                                           DCD00580
   DO STACK_PTR = @DCGLOB.STACK_TAIL REPEAT STACK.BKWD_PTR                DCD00590
                             WHILE(STACK_PTR¬=NULL);                      DCD00600
      DO SEL_PTR = STACK.SEL_PTR REPEAT SEL.DOWN_PTR                      DCD00610
                             WHILE(SEL_PTR¬=NULL);                        DCD00620
         IF SEL.NUMEXTNS>=0 THEN            /* Found an extended path */  DCD00630
            LEAVE LATEST_XTND;                                            DCD00640
      END;                                                                DCD00650
   END;                                                                   DCD00660
   /* Assume at least one extended path exists!! */                       DCD00670
   /* (ok .. even if first extension fails the numextns will be >= 0) */
                                                                          DCD00680
   /* Trace back no further than the start, or a fixed time      */      DCD00690
   /* before the latest path extended.                           */      DCD00700
   TBACK = MAX( 0, STACK.TIME-@DCPARM.EXTN_BACKUP );                      DCD00710
                                                                          DCD00720
   /* Find all boundaries of interest (i.e. that end paths)         */   DCD00730
   NPTS = 0;                                                              DCD00740
   DO STACK_PTR = @DCGLOB.STACK_TAIL REPEAT STACK.BKWD_PTR                DCD00770
                             WHILE( STACK_PTR¬=NULL );                    DCD00780
      IF STACK.TIME < TBACK THEN                                          DCD00790
         LEAVE;                                                           DCD00800
      DO SEL_PTR = STACK.SEL_PTR    REPEAT SEL.DOWN_PTR                   DCD00810
                             WHILE(SEL_PTR¬=NULL)
                             UNTIL(SEL.NUMEXTNS<=0);                      DCD00820
      END;                                                                DCD00830
      IF SEL_PTR ¬= NULL THEN           /* Found an un-extended .. */    DCD00840
         DO;                            /* .. or failed sel.        */    DCD00850
            OLDEST_EXTENDABLE = STACK.TIME; /* Currently the oldest. */   DCD00860
            IF NPTS<DIM(ENV.TIME,1) THEN                                  DCD00870
               DO;
                  NPTS = NPTS + 1;                                        DCD00880
                  ENV.TIME(NPTS) = STACK.TIME; /* Copy boundary time  */  DCD00890
                  ENV.SP(NPTS) = STACK_PTR;    /* .. and stack ptr    */  DCD00900
                  ENV.VAL(NPTS) = -1E3;        /* & initialize envelope */ DCD00910
               END;
```

```
*else if @db.dcdx>0 then put edit('DCDX: ENV array too small')(skip,a);
     END;                                                                 DCD00920
   END;                        /* when backed up far enough */DCD00930
                                                                          DCD00940
/* Traceback unextended AND failed paths if they end close to    */DCD00950
/* the current envelope, evaluating their profile at each of the */
/* envelope points.                                              */
   DO I=1 TO NPTS;                                                        DCD00960
     STACK_PTR = ENV.SP(I);                                               DCD00970
     DO SEL_PTR = STACK.SEL_PTR REPEAT SEL.DOWN_PTR WHILE(SEL_PTR¬=NULL);DCD00980
       IF SEL.LIKMLB < ENV.VAL(I) - @DCPARM.ENV_DELTA THEN                DCD00990
         LEAVE;                  /* This (& lower) SELs are               DCD01000
                                   too far below the envelope */ DCD01010
         /* Trace back path until all of profile is before oldest    */ DCD01020
         /* point of interest.  Profiles run from MLB+1 of start bndy */ DCD01030
         /* to MLB of end bndy, but they may overlap when a word ends */ DCD01040
         /* before it starts, so that its profile has negative length.*/ DCD01050
         /*  They can also have zero length, when the start and end   */ DCD01060
         /* MLBs are the same, usually on the "null" word .(TRM)      */ DCD01070
         /*  They can also have a gap between them when a silence is  */ DCD01080
         /* is skipped over.                                          */ DCD01090
         PREV_LB = ENV.TIME(1) + 1;        /* Largest value of interest */DCD01100
         IF SEL.NUMEXTNS <= 0 THEN         /* Trace from end of paths */ DCD01110
           DO P = SEL_PTR  REPEAT  P->SEL.BACK_PTR                       DCD01120
                      WHILE( P ¬= NULL )                                 DCD01130
                      UNTIL( PREV_LB <= OLDEST_EXTENDABLE );             DCD01140
             IF P->SEL.ITERATION=0 THEN    /* At a context sel.   */     DCD01190
               LEAVE;                      /* .. as has no profile. */   DCD01200
             Q = P->SEL.PROF_PTR;          /* Address prof structure */  DCD01150
             IF Q=NULL THEN                /* .(TRM) may have no prof */
               GOTO NEXT_SEL;              /* so step back */
             LB = Q->PROF.LB;              /* Get left bndy */           DCD01210
             RB_1 = LB + Q->PROF.LEN;      /* Get right bndy + 1 */      DCD01220
*if @db.dcdx>0 then if rb_1<prev_lb & p->sel.numextns>0 then/*underlap*/DCD01230
* do j=1 to npts; t=env.time(j); if t<prev_lb&t>=rb_1 then do; if kgap=0DCD01240
* then put file(dcout) edit('DCDX: env pt', t,' falls in silence after',DCD01250
* p->sel.id,'/',wdspel(p->sel.word))(skip,a,f(7),a,f(5),2 a);           DCD01260
* kgap=kgap+1; end; end;
             RB_1 = MIN(RB_1, PREV_LB);    /* Reduce if have overlap */ DCD01270
*if @db.dcdx>0 & rb_1 <= oldest_extendable then put edit('dcdx: path', DCD01280
* p->sel.id,' is too early:',lb,rb_1-1,' <',oldest_extendable)
* (skip,a,f(6),a,2 f(8),a,f(8));
             IF RB_1 <= OLDEST_EXTENDABLE THEN /* Profile ends before - */ DCD01300
               LEAVE;                      /* - oldest pt in envelope. */ DCD01310
             /* Find which points overlap the profile */              DCD01320
             DO J=1 TO NPTS;                                          DCD01330
               T = ENV.TIME(J);                                       DCD01340
               IF LB <= T & T < RB_1 THEN  /* Point is within profile */ DCD01350
                 DO;                                                  DCD01360
                 /* Assume AFM "profile" is constant */
                 VAL = P->SEL.BACK_PTR->SEL.LIK                 +     DCD01370
                       @DCPARM.LMWTD * P->SEL.LMPROB            +     DCD01380
                       @DCPARM.MCHWTD * Q->PROF.LPROB(T-LB+1)   +     DCD01390
                       @DCPARM.AFMWTD * P->SEL.AFM_SCORE;             DCD01390
*/* Not linear?                     * (T-LB+1) / Q->PROF.LEN; */
                 IF ENV.VAL(J) < VAL THEN                             DCD01400
*do;
                   ENV.VAL(J) = VAL;                                  DCD01430
```

```
*if @db.dcdx>2 then do;if t=lb then envc(j)='l';else if t=lb+q->prof.len
*-1 then envc(j)='r';else envc(j)='m';envp(j)=p; end; end;
              END;                                                        DCD01440
          END;                            /* of do j */                   DCD01450
          PREV_LB = LB;                   /* used if profiles overlap */  DCD01460
   NEXT_SEL:
        END;                              /* of tracing back a path */   DCD01470
     END;                                 /* when tried all in stack */  DCD01480
  END;                                    /* of all interesting points */DCD01490
                                                                          DCD01500
*if @db.dcdx>0 then if kgap>1 then put file(dcout) edit(' ..',kgap,       DCD01230
*  ' env pts fell in gaps')(a,f(6),a);
  /* Find the shortest unextended paths within the envelope.      */      DCD01510
  /* Consider only the first MAX_EXTN_RANK sels in each stack.    */      DCD01520
  /* "Failed" paths will have 0 extensions.                       */      DCD01530
  DO I=NPTS TO 1 BY -1;                   /* Start with oldest point */   DCD01580
    STACK_PTR = ENV.SP(I);                                                DCD01590
    SELRANK = 0;                          /* Rank of SEL in stack */      DCD01600
    DO SEL_PTR = STACK.SEL_PTR REPEAT SEL.DOWN_PTR WHILE(SEL_PTR¬=NULL)    DCD01610
                            UNTIL(SELRANK = @DCPARM.MAX_EXTN_RANK);       DCD01620
      IF SEL.LIKMLB < ENV.VAL(I) - @DCPARM.ENV_DELTA THEN                 DCD01630
        LEAVE;                            /* Below envelope delta */      DCD01640
      SELRANK = SELRANK + 1;                                              DCD01650
      IF SEL.NUMEXTNS < 0 THEN                                            DCD01660
        DO;                               /* Unextended */                DCD01670
          PATHSXT.NUMPATHS = PATHSXT.NUMPATHS + 1;                        DCD01680
          PATHSXT.SELS(PATHSXT.NUMPATHS) = SEL_PTR;                       DCD01690
          IF SEL.ATSILENCE THEN                                           DCD01700
            PATHSXT.ATSILENCE = '1'B;     /* "OR" atsilence bits */       DCD01710
        END;                              /* After saving path ptr */    DCD01720
    END;                                  /* Of all SELs in a stack */   DCD01730
    IF PATHSXT.NUMPATHS>0 THEN                                            DCD01740
      LEAVE;                              /* Quit when found paths */    DCD01750
  END;                                                                    DCD01760
  PATHSXT.STACK_PTR = STACK_PTR;          /* Stack to be extended */
                                                                          DCD01770
  DCL                                                                     DCD01780
    (LB1,LB2,RB1,RB2) FIXED BIN(31);                                      DCD01790
  /* Check if all paths have the same bndy distribution */                DCD01800
  /* (Must use WHILE as upper bound for I may be changed in loop) */     DCD01810
  IF PATHSXT.NUMPATHS > 1 THEN                                            DCD01820
    BNDY_PTR = PATHSXT.SELS(1)->SEL.BNDY_PTR;                             DCD01830
  if @db.dcdx>1 |                                                         DCD01840
     @DCPARM.BNDY_IDENT.THR > 0 THEN      /* Check only if > 0 */         DCD01850
    DO I=2 BY 1 WHILE( I <= PATHSXT.NUMPATHS );                           DCD01860
      P = PATHSXT.SELS(I);                                                DCD01870
      Q = P->SEL.BNDY_PTR;                                                DCD01880
      DIFF = 0;                                                           DCD01890
      LB1 = BNDY.LB;                                                      DCD01900
      LB2 = Q->BNDY.LB;                                                   DCD01910
      RB1 = BNDY.LB + BNDY.LEN - 1;                                       DCD01920
      RB2 = Q->BNDY.LB + Q->BNDY.LEN - 1;                                 DCD01930
      IF LB1=LB2 & RB1=RB2 THEN                                           DCD01940
        DO J=1 TO BNDY.LEN;                                               DCD01950
          DIFF = DIFF + ABS( BNDY.PROB(J) - Q->BNDY.PROB(J) );             DCD01960
        END;                                                              DCD01970
      ELSE                                                                DCD01980
        DO; /* boundaries not aligned */                                  DCD01990
          DO T = MIN(LB1,LB2) TO MAX(RB1,RB2);                            DCD02000
            IF T < LB1 | T > RB1 THEN                                     DCD02010
              DIFF = DIFF + ABS( Q->BNDY.PROB(T - LB2 + 1) );              DCD02020
```

```
              ELSE                                                      DCD02030
                IF T < LB2 | T > RB2 THEN                               DCD02040
                  DIFF = DIFF + ABS( BNDY.PROB(T - LB1 + 1) );          DCD02050
                ELSE                                                    DCD02060
                  DIFF = DIFF +                                         DCD02070
                    ABS( BNDY.PROB(T-LB1+1) - Q->BNDY.PROB(T-LB2+1) );  DCD02080
              END;                                                      DCD02090
            END;                                                        DCD02100
                                                                        DCD02110
*if @db.dcdx>1 then                                                     DCD02120
*  if diff > abs(@dcparm.bndy_ident_thr) then do;                       DCD02130
*   if @dcparm.bndy_ident_thr>0 then @s = 'dropping'; else @s = '';     DCD02140
*   put edit('DCDX:',@s,i,'-th path',p->sel.id,' "',                    DCD02150
*   wdspel(p->sel.word),'" @',p->sel.time,', diff =',diff,lb2-lb1,rb2-rb1)DCD02160
*     (skip,2 a,f(3),a,f(4),3 a,f(5),a,f(7,4),2 f(4));                  DCD02170
*/*if @ws@>0 then                                                       DCD02180
*  do t=min(lb1,lb2) to max(rb1,rb2);                                   DCD02190
*    if t<lb2 | t>rb2 then                                              DCD02200
*      put edit(t,bndy.prob(t-lb1+1)) (skip,f(6),f(12,8),x(12));        DCD02210
*    else if t<lb1 | t>rb1 then                                         DCD02220
*      put edit(t,q->bndy.prob(t-lb2+1)) (skip,f(6),x(12),f(12,8));     DCD02230
*    else put edit(t,bndy.prob(t-lb1+1),q->bndy.prob(t-lb2+1) )         DCD02240
*              (skip,f(6),2 f(12,8));                                   DCD02250
*  end; */                                       end;                   DCD02260
*if @dcparm.bndy_ident_thr > 0 then                                     DCD02270
            IF DIFF > @DCPARM.BNDY_IDENT_THR THEN                       DCD02280
              DO;                                                       DCD02290
                PATHSXT.NUMPATHS = PATHSXT.NUMPATHS - 1;                DCD02300
                DO J=I TO PATHSXT.NUMPATHS;   /* Move up remaining paths */ DCD02310
                  PATHSXT.SELS(J) = PATHSXT.SELS(J+1);                  DCD02320
                END;                                                    DCD02330
                I = I - 1;                    /* Ready to check moved one */ DCD02340
              END;                                                      DCD02350
          END;                                /* do for all paths after 1st*/DCD02360
                                                                        DCD02370
*if @db.dcdx>2 then put                                                 DCD02380
*  edit('DCDX:',npts,' pt envelope @', (env.time(i) do i=1 to npts),    DCD02390
*        ' (traceback to',tback,')',(env.val(i) do i=1 to npts),        DCD02400
*      (envp(i)->sel.id,'-',envc(i)   do i=1 to npts))                  DCD02410
*   (skip,a,f(3),a,(npts) f(7),   skip,a,f(5),a,(npts) f(7,1),          DCD02420
*   col(23),(npts) (f(5),2 a));                                         DCD02430
*if @db.dcdx > 2 then if numpaths=0                                     DCD02440
*   then put edit('DCDX: found no paths.')(skip,a);                     DCD02450
*   else put edit('DCDX: found',numpaths,' paths at time',              DCD02460
*      pathsxt.sels(1)->sel.time,':',(pathsxt.sels(i)->sel.id           DCD02470
*      .  do i=1 to numpaths))(skip,a,f(4),a,f(6),a,99 f(6));           DCD02480
*if @db.dcdx>0 then do;  do i=1 to numpaths while                       DCD02490
*    (pathsxt.atsilence = pathsxt.sels(i)->sel.atsilence);  end;        DCD02500
*         if i<=numpaths then if pathsxt.atsilence then                 DCD02510
*    put edit('DCDX: not all paths atsil?')(skip,a);                    DCD02520
*    else put edit('DCDX: some paths atsil?')(skip,a);end;              DCD02530
```

```
*if @db.dcdx > 3 & numpaths>0 then do i=1 to numpaths;        DCD02540
*       call dcprsel(pathsxt.sels(i),'DCDX FOUND:',13);   end; DCD02550
*         %include @debug;                                     DCD02570
*·          dcl dcout file print, @s char(20) var,             DCD02580
*              wdspel entry(fixed bin(15)) returns(char(50)var), DCD02590
*              dcprsel entry(ptr,char(*),fixed bin(15));       DCD02600
                                                               DCD02610
   RETURN;                                                     DCD02620
                                                               DCD02630
   /* NOTE:                                                    DCD02640
      When making envelopes, Lalit doesn't use paths that have the  DCD02650
   same language context as a better path. (He also, of course,    DCD02660
   doesn't try to extend such paths .. these are recognized at     DCD02670
   insertion time in our case).                                    DCD02680
      When choosing the shortest unextended paths within the window, DCD02690
   he truncates the list if the rank of the path is too large.    DCD02700
   This is to prevent extending a path from a point at which many DCD02710
   other paths are more probable.  This is necessary for continous DCD02720
   speech where this point may not be a real boundary.            DCD02730
   The rank is measured relative to ALL paths ever traced back    DCD02740
   through this point .. not just those with a boundary at this   DCD02750
   time, and not just those traced back during the construction   DCD02760
   of this envelope.  This is not easy to do .. Lalit keeps a     DCD02770
   matrix of counts within quantized likelihoods (I think!).      DCD02780
   Since his rank threshold seems to be about 10, we could        DCD02790
   keep the top 10 likelihoods seen as a function of time in      DCD02800
   the recent past (maybe only at known boundaries?)              DCD02810
        ** this overall-rank-truncation not done here **          DCD02820
   */                                                             DCD02830
   END;                                                           DCD02840
```

We claim:

1. In a speech recognition system having an acoustic processor which generates a string of acoustic labels in response to speech input and a decoder which matches words in a vocabulary against generated labels in a string, a method of forming at least one likely sequence of words for a speech input, the method comprising the steps of:
   (a) generating a string of labels in response to a speech input;
   (b) selecting words from a vocabulary as possible first words corresponding to labels at the beginning of the string;
   (c) for a subject selected word,
      (i) locating a most likely boundary label interval in the string whereat the subject selected words has the highest probability of ending; and
      (ii) evaluating a respective likelihood of the subject selected word at each label interval of the string up to and including the most likely boundary label interval;
   (d) repeating step (c) for each selected word as the subject selected word; and
   (e) classifying a given selected word as extendible if the likelihood at the particular label interval corresponding to the most likely boundary label interval thereof is within a predefined range of the highest likelihood for any selected word at said particular label interval.

2. The method of claim 1 wherein step (e) is repeated for each selected word starting with the longest selected word as the given selected word and wherein the method comprises the further step of:
   (f) extending the shortest extendible selected word including the step of forming a list of likely follower words, each of which has a relatively high probability of following the extendible selected word, each word in the list of likely follower words being from the vocabulary of words.

3. The method of claim 2 wherein the list forming step comprises the steps of:
   (g) choosing a word from the vocabulary;
   (h) evaluating the acoustic probability of the chosen word producing the labels in the string which follow the most likely boundary label interval of the extendible selected word; and
   (j) repeating steps (g) and (h) for each word in the vocabulary;
   a number of words, based on probability, being characterized as candidate words, each candidate word corresponding to a likely follower word.

4. The method of claim 2 wherein the list forming step comprises the steps of:
   (k) choosing a word from the vocabulary;
   (m) evaluating the acoustic probability of the chosen word producing the labels in the string which follow the most likely boundary label interval of the extendible selected word;

(n) repeating steps (k) and (m) for each word in the vocabulary;

each chosen word having an acoustic probability satisfying a first predefined threshold being a candidate word; and (o) evaluating a respective language model probability for each candidate word;

each candidate word having a language model probability satisfying a second predefined threshold being a likely follower word.

5. The method of claim 4 comprising the further steps of:

(p) appending one of the likely follower words to said shortest extendible selected word to form a corresponding word path; and (q) repeating step (p) for each likely follower word, a respective word path being formed for each likely follower word;

each path corresponding to said shortest extendible selected word followed by a respective likely follower word.

6. The method of claim 5 including the further step of:

(r) classifying a given path as extendible if the likelihood at the particular label interval corresponding to the most likely boundary label interval of the last word in the given path is within a predefined range of the highest likelihood for any path at said particular label interval; and (s) substituting the shortest extendible selected word with the shortest extendible path and repeating steps (f) through (q) for the shortest extendible path.

7. The method of claim 6 comprising the further steps of:

(t) repeating steps (r) and (s) until there are no extendible paths.

8. In a speech recognition system having an acoustic processor that generates labels selected from an alphabet thereof in response to speech input, a method of determining a likely word path from a plurality of word paths given a string of labels generated at successive intervals, the method comprising the steps of:

(a) assigning to each label interval a label stack;

(b) determining for a subject word path (i) a boundary label interval at which the subject word path most likely ends (ii) a likelihood at each label prior to and including the boundary label thereof;

(c) assigning the subject word path to the label stack corresponding to the boundary label thereof as an entry therein;

(d) repeating steps (b) and (c) for each word path;

(e) forming a likelihood envelope that includes a likelihood value at each label along the string of labels;

(f) setting each likelihood value in the envelope to an initial value;

(g) reducing each likelihood value in the likelihood envelope;

(h) examining the word path entries in all label stacks longest first and, where a label stack has more than one entry, examining the word paths based on decreasing likelihood wherein said examining includes the step of:

(i) classifying a word path as good if the likelihood at the label corresponding to the boundary label for a subject word path exceeds the reduced likelihood at the label corresponding to the boundary label; and (ii) repeating step (h)(i) for each word path as the subject word path;

(j) after classifying a word path as good, up-dating the likelihood value for each label in the envelope as either (a) the current likelihood value in the envelope or (b) the likelihood value in the classified good word path, whichever is greater; and (k) after all word paths have been classified, selecting the shortest good word path as the word path to be extended or, if there is more than one good word path having the shortest length, selecting the shortest word path having the highest likelihood value at the boundary label thereof.

9. The method of claim 8 comprising the further step of:

(m) extending the selected shortest good word path to form at least one extended word path, each extended word including the selected shortest good word path to which is appended a likely follower word.

10. The method of claim 9 comprising the further step of:

(n) determining for an extended word path (i) a boundary label interval at which the extended word path most likely ends and (ii) a likelihood at each label interval prior to and including the boundary label interval thereof;

(o) assigning the extended word path to the label stack corresponding to the boundary label thereof as an entry therein;

(p) deleting from a stack any word path which has been extended; and (q) repeating steps (h) through (p) until no good paths remain;

the contents of the complete-path stack corresponding to a likely word path.

11. The method of claim 10 comprising the further step of:

(r) forming a list of likely follower words, each of which has a relatively high probability of following the selected shortest good path, each word in the list of likely follower words being from the vocabulary of words.

12. The method of claim 11 wherein the list forming step comprises the steps of:

(s) choosing a word from the vocabulary;

(t) evaluating the acoustic probability of the chosen word producing the labels in the string which follow the most likely boundary label interval of the extendible selected word; and (u) repeating steps (s) and (t) for each word in the vocabulary;

each word having a probability above a predefined level being a candidate word and each candidate corresponding to a likely follower word.

13. The method of claim 11 wherein the list forming step comprises the steps of:

(v) choosing a word from the vocabulary;

(w) evaluating the acoustic probability of the chosen word producing the labels in the string which follow the most likely boundary label interval of the selected shortest good word path;

(x) repeating steps (v) and (w) for each word in the vocabulary;

each chosen word having an acoustic probability above a first predefined threshold being a candidate word; and (y) evaluating a respective language model probability for each candidate word;

each candidate word having a language model probability above a second predefined threshold being a likely follower word.

14. The method of claim 8 wherein the reducing step includes the step of:

(z) reducing all likelihoods by the same value.

15. The method of claim 8 wherein word paths corresponding to complete sentences are identified and wherein the method includes the further step of:

(aa) maintaining a complete-path stack which contains the most likely word path, if any, corresponding to a complete sentence; and wherein the envelope setting step includes the step of:

(bb) initializing a likelihood envelope as (i) the respective likelihoods for the word path contained in the complete-path stack or (ii), if there is not word path contained in the complete-path stack, a minimum reference likelihood at each label interval.

16. In a speech recognition system having an acoustic processor which generates a string of acoustic labels in response to speech input, a method of selecting a likely sequence of words corresponding to a label string, the method comprising the steps of:

(a) generating labels at successive time intervals in response to spoken input;

(b) identifying a plurality of word paths;

(c) associating with a subject word path a plurality of likelihoods, each ith likelihood thereof corresponding to the likelihood of the subject word path given the first i generated labels;

(d) repeating step (c) for each identified word path;

(e) for a given path, determining a boundary label which has the highest likelihood of all generated labels of corresponding to the end of the latest word in said given path;

(f) assigning the given path of step (e) to a stack corresponding to the determined boundary label;

(g) repeating steps (e) and (f) for each word path as the given path;

(j) forming a likelihood envelope with successive points therealong corresponding to successive label intervals including the step of initializing the envelope to a minimum reference value for each label interval; and (k) reducing the likelihoods of the envelope by a predefined level;

(m) marking word paths as good or bad starting with the unmarked word path ending at the latest label interval and, if more than one word path ends at the latest label interval, starting with the word path having the highest likelihood value at the latest label interval wherein said marking includes the step of identifying a path as good if the likelihood value at the boundary label thereof exceeds the reduced likelihood corresponding to the boundary label and bad otherwise;

(n) repeating step (m) for successive unmarked word paths that end with successively earlier boundary labels;

(o) updating the envelope with the likelihoods of a word path when marked as good;

(p) when all word paths have been marked, selecting the good path ending with the earliest boundary label and, if more than one good path ends with the earliest boundary label, selecting the word path having the highest likelihood value at the earliest boundary label;

(q) extending the selected good path including the steps of:

(i) appending follower words to the selected good path to form new paths, each including the selected good path with a respective follower word appended thereto; and (ii) removing the selected good path from the boundary label stack corresponding thereto;

(r) repeating steps (j) through (q) until no good word paths remain; and (s) after no good word paths remain, selecting the complete path having the highest likelihood at the boundary label thereof as the word path corresponding to the generated labels.

17. In a speech recognition system having an acoustic processor that generates labels selected from an alphabet thereof in response to speech input, apparatus for determining a likely word path from a plurality of word paths given a string of labels generated at successive intervals wherein word paths corresponding to sentences are recognized, the apparatus comprising:

(a) means for assigning to each label interval a label stack;

(b) means for determining for a subject word path (i) a boundary label interval at which the subject word path most likely ends and (ii) a likelihood at each label interval prior to and including the boundary label interval thereof;

(c) means for assigning the subject word path to the label stack corresponding to the boundary label thereof as an entry therein;

(d) said determining means and assigning means acting on each word path;

(e) means for maintaining a complete-path stack which contains the most likely word path, if any, corresponding to a sentence;

(f) means for forming a likelihood envelope as (i) the respective likelihoods for the word path contained in the complete-path stack or (ii), if there is no word path contained in the complete-path stack, a minimum reference likelihood at each label interval;

(g) means for reducing the likelihoods in the likelihood envelope;

(h) means for examining the word path entries in all label stacks longest first and, where a label stack has more than one entry, examining the word paths based on decreasing likelihood wherein said examining means includes:

(i) means for classifying a word path as good if the likelihood at the label corresponding to the boundary label for a subject word path exceeds the reduced likelihood at the label corresponding to the boundary label;

(ii) said classifying means acting on each word path as the subject word path;

(j) means for up-dating, after classifying a word path as good, the likelihood value for each label in the envelope or (b) the likelihood value in the classified good word path, whichever is greater; and (k) means for selecting, after all word paths have been classified, the shortest good word path as the word path to be examined or, if there is more than one good word path having the shortest length, selecting the shortest word path having the highest likelihood value at the boundary label thereof.

* * * * *